United States Patent
Shiroyama et al.

[11] Patent Number: 6,163,731
[45] Date of Patent: Dec. 19, 2000

[54] APPARATUS AND METHOD FOR CREATING PARTS REMOVAL ORDER AND RECORDING MEDIUM RECORDING PARTS REMOVAL ORDER PROGRAM

[75] Inventors: Koji Shiroyama; Tomotoshi Ishida, both of Hitachinaka, Japan

[73] Assignee: Hitachi, Ltd., Tokyo, Japan

[21] Appl. No.: 08/998,555

[22] Filed: Dec. 24, 1997

[30] Foreign Application Priority Data

Dec. 26, 1996 [JP] Japan .................................. 8-348604

[51] Int. Cl.$^7$ ...................................................... G06F 19/00
[52] U.S. Cl. ............................. 700/102; 700/100; 700/95
[58] Field of Search ................................. 700/90, 95, 97, 700/86, 79–82, 180–185, 99–103, 105; 29/700–703, 426.1–426.2

[56] References Cited

U.S. PATENT DOCUMENTS

| | | | |
|---|---|---|---|
| 4,604,718 | 8/1986 | Norman et al. | 395/500.27 |
| 5,469,361 | 11/1995 | Moyne | 700/95 |
| 5,490,097 | 2/1996 | Swenson et al. | 395/500.23 |
| 5,504,687 | 4/1996 | Wolf | 700/95 |
| 5,506,783 | 4/1996 | Tanaka et al. | 700/101 |
| 5,523,960 | 6/1996 | Jeong | 395/500.27 |
| 5,555,406 | 9/1996 | Nozawa | 395/500.01 |
| 5,586,022 | 12/1996 | Arimoto et al. | 700/97 |
| 5,586,039 | 12/1996 | Hirsch et al. | 700/95 |
| 5,586,052 | 12/1996 | Iannuzzi et al. | 395/500.01 |
| 5,587,914 | 12/1996 | Conradson et al. | 700/95 |

FOREIGN PATENT DOCUMENTS

| | | |
|---|---|---|
| 5-143695 | 6/1993 | Japan . |
| 07239866A | 9/1995 | Japan . |

OTHER PUBLICATIONS

T.C. Woo et al, Automatic Disassembly and Total Ordering in Three DImensions, Journal of Engineering for Industry, May 1991, vol. 113, pp. 207–213.

*Primary Examiner*—William Grant
*Assistant Examiner*—Paul Rodriguez
*Attorney, Agent, or Firm*—Antonelli, Terry, Stout & Kraus, LLP

[57] ABSTRACT

The present invention relates to an apparatus and method which can create a parts removal order for taking out a valuable substance free of flaw from a structure which is assembled by welding or others and not easily disassembled and a recording medium recording a program therefor. The present invention creates a parts removal order including parts split by creating removal order data by the removal order creation unit using the split connection or mating relation data created by the split connection or mating creation unit.

16 Claims, 33 Drawing Sheets

PART 3

SHAPE

TARGET PARTS DATA

| 2801 | PART 1 | PART 2 | PART 3 | ... |
| 2802 | GEOMETRIC INFORMATION | GEOMETRIC INFORMATION | GEOMETRIC INFORMATION | ... |

FIG. 34

| PART 5 | PART 5 |
|---|---|
| PART 3 | PART 4 |
| PLANE CONTACT | PLANE CONTACT |
| (1,0,0) | (1,0,0) |
| GEOMETRIC INFORMATION OF BOUNDARY | GEOMETRIC INFORMATION OF BOUNDARY |
| PART 5 | PART 5 |
| PART 3 | PART 4 |
| PLANE CONTACT | PLANE CONTACT |
| (-1,0,0) | (-1,0,0) |
| GEOMETRIC INFORMATION OF BOUNDARY | GEOMETRIC INFORMATION OF BOUNDARY |
| PART 5 | PART 5 |
| PART 3 | PART 4 |
| PLANE CONTACT | PLANE CONTACT |
| (0,0,1) | (0,0,-1) |
| GEOMETRIC INFORMATION OF BOUNDARY | GEOMETRIC INFORMATION OF BOUNDARY |

APPARATUS AND METHOD FOR CREATING PARTS REMOVAL ORDER AND RECORDING MEDIUM RECORDING PARTS REMOVAL ORDER PROGRAM

BACKGROUND OF THE INVENTION

The present invention relates to a parts removal order creation apparatus and method for generating the order of work for removing designated parts from an assembled machine product and a recording medium recording a program for generating a parts removal order.

When a machine product is to be discarded, parts including valuable substances are removed and reused. However, an operator performing a discard operation of a machine product is different from the designer and assembly operator of the machine product, so that he cannot find the removal order of parts including valuable substances simply. Therefore, if it is possible to create the removal order of parts designated in the stage of design and notify a discard operator of the data, the efficiency of discard operation can be improved. Parts of an assembled machine product which are a target of removal like parts including valuable substances are called target parts.

As a method for creating the removal order of designated parts, a method for creating the assembly and disassembly order of an assembled machine product is disclosed in "T. C. Woo et al., Automatic Disassembly and Total Ordering in Three Dimensions, Journal of Engineering for Industry, May 1991, Vol. 113, pp 207–213".

SUMMARY OF THE INVENTION

According to the method disclosed in this thesis, connection or mating relation data indicating the relationship between parts in the assembled state is inputted and disassembly order data indicating the disassembly order is created and displayed from this connection or mating relation data. To create the disassembly order, whether each part can be disassembled or not is decided from the connection relation data first. When it is decided that each part can be disassembled, the connection or mating relation between the part and opposite part is deleted. By repeating this process until all parts are disassembled, the disassembly order is created.

The disassembly order creation method disclosed in the aforementioned thesis is a method for obtaining the assembly order or the order of disassembly without deforming parts. However, when there is a connection or mating relation in a machine product that an assembled part cannot be disassembled like welding, although assembly is possible, disassembly is impossible. For example, when an outermost part is connected to an inside part thereof by welding and the inside part cannot be removed unless the outermost part is removed, a parts removal order cannot be created by the disassembly order creation method disclosed in the aforementioned thesis.

The present invention is designed so as to solve the problem of this conventional disassembly order creation method.

When there is a connection or mating relation in which an assembled part cannot be disassembled like this, by performing an operation for disassembling a single part to a plurality of parts by cutting or others, the target part can be removed. For example, even in the aforementioned case, by splitting the covered portion of the part covering another part on the outermost side, the inside part can be removed.

The parts removal order creation apparatus of the present invention comprises a connection or mating relation input means for inputting connection or mating relation data indicating the relationship among parts in the assembled state, a parts split input means for inputting parts split data indicating the part to be split and the split surface thereof, a target parts input means for inputting target part data indicating a target part which is a target of removal, a split connection or mating relation creation means for creating split connection or mating relation data indicating the connection or mating relation after the parts are split in accordance the connection relation data inputted by the connection or mating relation input means and the parts split data inputted by the parts split input means, a removal order creation means for creating removal order data indicating the order until at least the target part also including parts which are split is removed from the split connection or mating relation data created by the split connection or mating relation creation means and the target part data created by the target parts input means, and a display means for displaying the removal order data created by the removal order creation means. By doing this, the target part removal order can be created and displayed from the split connection or mating relation data and the target part data, so that even if there is a connection or mating relation in a product that an assembled part cannot be disassembled like welding, it is possible to disassemble the product and take out a valuable substance which is a target part.

The parts removal order creation apparatus comprises a connection relation input means for inputting connection relation data indicating the relationship among parts in the assembled state, a target parts input means for inputting target part data indicating a target part which is a target of removal, a shape input means for inputting shape data indicating the shape of each part of a product to be disassembled, a parts split data creation means for obtaining parts split necessary to remove the part described in the target part data from the connection relation data inputted by the connection relation input means, the target part data inputted by the target parts input means, and the shape data inputted by the shape input means and outputting it as parts split data, a split connection relation creation means for creating split connection relation data indicating the connection relation after parts split from the connection relation data inputted by the connection relation input means and the parts split data created by the parts split data creation means, a removal order creation means for creating removal order data indicating the order until at least the target part including parts split is removed from the split connection relation data created by the split connection relation creation means and the target part data inputted by the target parts input means, and a display means for displaying the removal order data created by the removal order creation means. By doing this, the target part removal order for splitting a part causing an obstacle to removal of the target part according to the shape of each part can be displayed, so that even if there is a connection relation in a product that an assembled part cannot be disassembled, it is possible to disassemble the product and take out a valuable substance which is a target part.

The parts removal order creation method of the present invention comprises a connection relation input step of inputting connection relation data indicating the relationship among parts in the assembled state, a parts split input step of inputting parts split data indicating the part to be split and the split surface, a target parts input step of inputting target part data indicating a target part which is a target of removal, a split connection relation creation step of creating split connection relation data indicating the connection relation after parts split from the connection relation data inputted by the connection relation input step and the parts split data inputted by the parts split input step, a removal order creation step of creating removal order data indicating the order until at least the target part also including parts split is removed from the split connection relation data created by the split connection relation creation step and the target part data inputted by the target parts input step, and a display step of displaying the removal order data created by the removal order creation step. By doing this, even if there is a connection relation in a product that an assembled part cannot be disassembled, the target part removal order for disassembling the product and taking out the valuable substance which is a target part can be created and displayed.

The parts removal order creation apparatus comprises a connection relation input step of inputting connection relation data indicating the relationship among parts in the assembled state, a target parts input step of inputting target part data indicating a target part which is a target of removal, a shape input step of inputting shape data indicating the shape of each part of a product to be disassembled, a parts split data creation step of obtaining parts split necessary to remove the part described in the target part data from the connection relation data inputted by the connection relation input step, the target part data inputted by the target parts input step, and the shape data inputted by the shape input step and outputting it as parts split data, a split connection relation creation step of creating split connection relation data indicating the connection relation after parts split from the connection relation data inputted by the connection relation input step and the parts split data created by the parts split data creation step, a removal order creation step of creating removal order data indicating the order until at least the target part including parts split is removed from the split connection relation data created by the split connection relation creation step and the target part data inputted by the target parts input step, and a display step of displaying the removal order data created by the removal order creation step. By doing this, the target part removal order for splitting a part causing an obstacle to removal of the target part according to the shape of each part can be displayed and even if there is a connection relation in a product that an assembled part cannot be disassembled, it is possible to disassemble the product and take out a target part.

The recording medium recording the parts removal order program of the present invention records a program for allowing a computer to execute a connection relation input step of inputting connection relation data indicating the relationship among parts in the assembled state, a parts split input step of inputting parts split data indicating the part to be split and the split surface, a target parts input step of inputting target part data indicating a target part which is a target of removal, a split connection relation creation step of creating split connection relation data indicating the connection relation after parts split from the connection relation data inputted by the connection relation input step and the parts split data inputted by the parts split input step, a removal order creation step of creating removal order data indicating the order until at least the target part also including parts split is removed from the split connection relation data created by the split connection relation creation step and the target part data created by the target parts input step, and a display step of displaying the removal order data created by the removal order creation step. When the computer reads this recording medium, even if there is a connection relation in a product that an assembled part cannot be disassembled, the parts removal order for disassembling the product and taking out the target part can be displayed on the computer.

The recording medium recording the parts removal order program of the present invention records a program for allowing a computer to execute a connection relation input step of inputting connection relation data indicating the relationship among parts in the assembled state, a target parts input step of inputting target part data indicating a target part which is a target of removal, a shape input step of inputting shape data indicating the shape of each part of a product to be disassembled, a parts split data creation step of obtaining parts split necessary to remove the part described in the target part data from the connection relation data inputted by the connection relation input step, the target part data inputted by the target parts input step, and the shape data inputted by the shape input step and outputting it as parts split data, a split connection relation creation step of creating split connection relation data indicating the connection relation after parts split from the connection relation data inputted by the connection relation input step and the parts split data created by the parts split data creation step, a removal order creation step of creating removal order data indicating the order until at least the target part including parts split is removed from the split connection relation data created by the split connection relation creation step and the target part data inputted by the target parts input step, and a display step of displaying the removal order data created by the removal order creation step. When the computer reads this recording medium, even if there is a connection relation in a product that an assembled part cannot be disassembled, the parts removal order for disassembling the product and taking out the target part can be displayed on the computer.

BRIE DESCRIPTION OF THE DRAWINGS

FIG. 34 is a table showing connection relation data between removal obstacle parts of the machine product shown in FIG. 29 and target parts.

DESCRIPTION OF THE PREFERRED EMBODIMENTS OF THE INVENTION

An embodiment of the present invention will be explained hereunder with reference to the accompanying drawings.

Figures 1, 2:
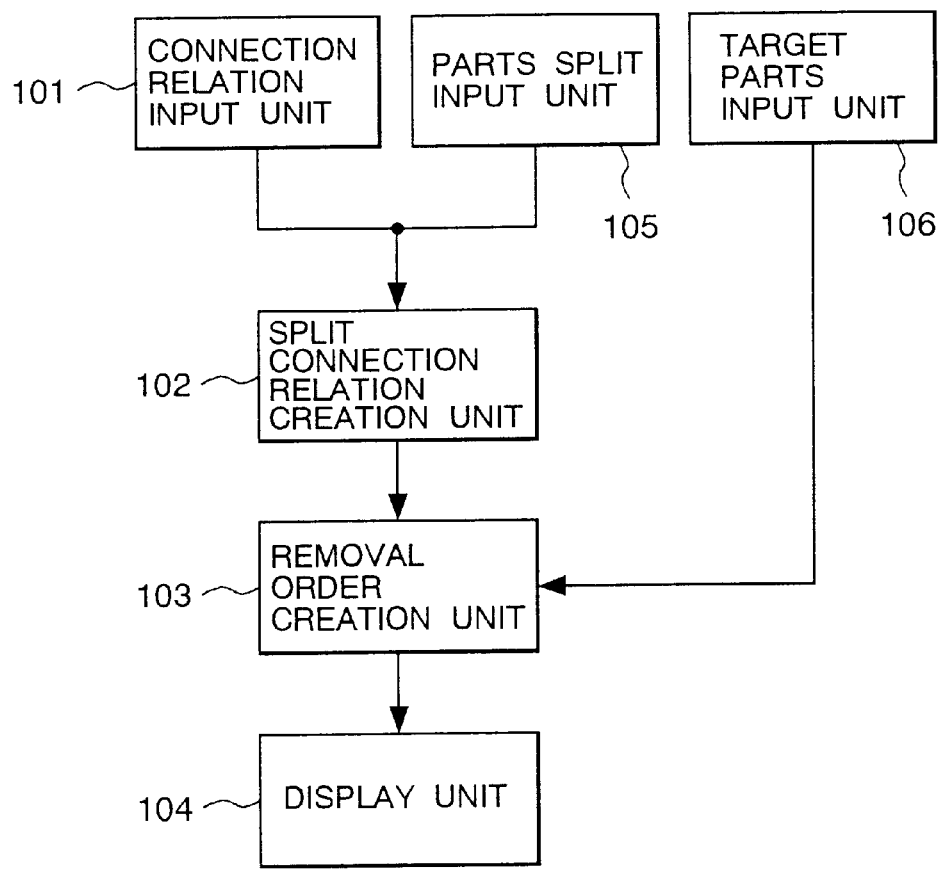
FIG. 1 is a block diagram showing the function constitution of the first embodiment of the parts removal order creation apparatus of the present invention.
FIG. 2 is a drawing showing an example of target part data used by the parts removal order creation apparatus shown in FIG. 1 when the target part is singular.

FIG. 1 is a function block diagram showing the function constitution of the first embodiment of the parts removal order creation apparatus of the present invention. In the drawing, a connection or mating relation input unit 101 is a function for inputting connection or mating relation data representing the relationship between parts which are assembled by using a screw or in the plane contact state using an operation unit such as a keyboard or mouse and a display unit such as a display. A parts split input unit 105 is a function for inputting parts split data representing a part to be split and split surfaces thereof using an operation unit such as a keyboard or mouse and a display unit such as a display. A target parts input unit 106 is a function for inputting target part data representing a target part which is a removal target using an operation unit such as a keyboard or mouse and a display unit such as a display.

Figure 3:
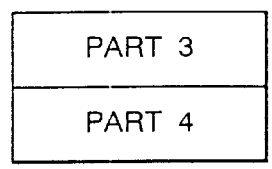
FIG. 3 is a drawing showing an example of target part data used by the parts removal order creation apparatus shown in FIG. 1 when the target parts are plural.
Figure 4:
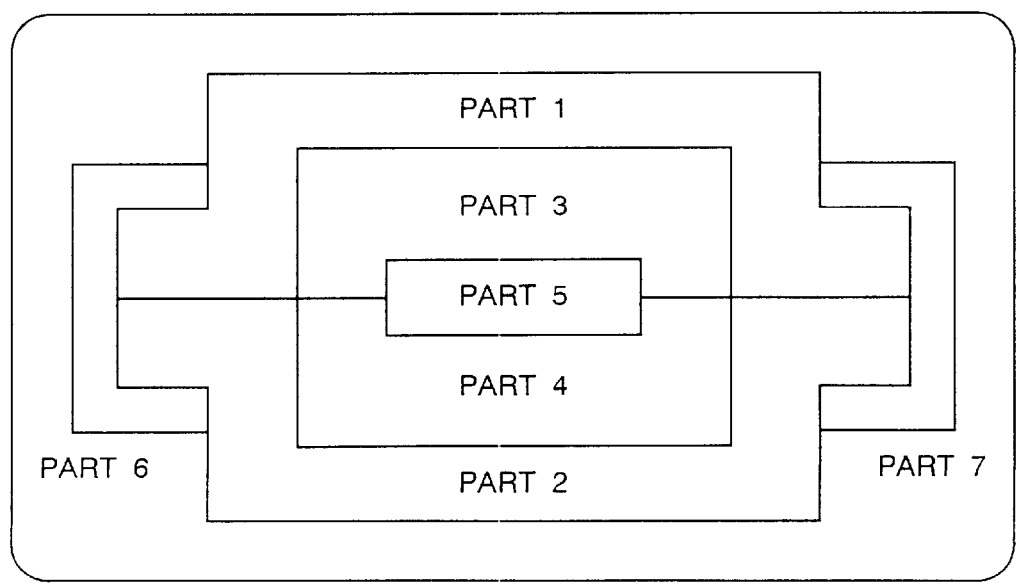
FIG. 4 is a drawing showing an example of a machine product for which the parts removal order creation apparatus shown in FIG. 1 creates the parts removal order.

Target part data is, as shown in FIG. 2 for example, data of a character string of the part name of a target part ("Part 3" in the example shown in FIG. 2). Target part data may be data relating to, as shown in FIG. 3, a plurality of parts ("Part 3" and "Part 4" in the example shown in FIG. 3).

To input target part data, a method, for example, for inputting the part name to be removed by the keyboard or for instructing the target part by the mouse from the shape in the assembled state on the screen of a display unit is used. FIG.

4 shows an example of the shape of an assembled machine product displayed on the screen of a display unit. In this case, for simple explanation, the machine product is displayed two-dimensionally, though the concrete machine product is in a three-dimensional shape having the thickness in the depth direction. By instructing the target part from the shape shown on the screen like this, the target part data is inputted.

Figure 5:
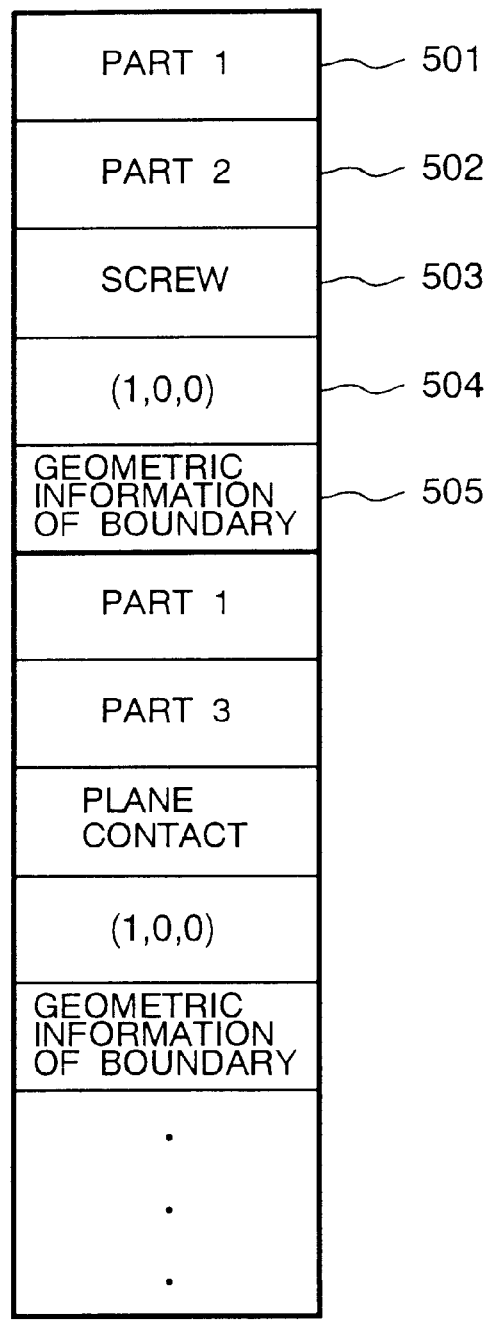
FIG. 5 is a drawing showing an example of connection relation data used by the parts removal order creation apparatus shown in FIG. 1.

Connection or mating relation data comprises, as shown in FIG. 5 for example, character string data 501 indicating the part (referred to as "object part") noticed in a certain connection relation, character string data 502 indicating the part name of the destination in connection relation with the object part, character string data 503 indicating the kind of connection relation, numerical data 504 indicating the direction of connection or mating relation, and geometric information data of boundary 505 indicating the position of connection or mating relation. The kind of connection or mating relation includes screw and plane contact as well as welding, calking, bonding, etc. There is a kind of connection or mating relation available such that the object part and destination part can be interchanged with each other like plane contact. However, for the convenience of definition of the direction, one side is assumed as the object part and the other side is assumed as the destination part. The direction of connection or mating relation is indicated so that the direction of connection or mating is uniquely decided for each kind of connection or mating relation like the axial direction in the case of a screw and the normal vector of the contact surface of the object part in the case of plane contact. The position of connection or mating relation is indicated by geometric information of the boundary of the connection or mating portion. In the case of plane contact, it is indicated by geometric information of the boundary line of the contact portion. In FIG. 5, for simple indication, "Geometric information of boundary" is displayed. Actually, the geometric information of each line constituting the boundary line is inputted. For example, when the boundary line is a straight line, the coordinate data of the start point and end point and the data indicating that it is a straight line are inputted.

Figure 6:
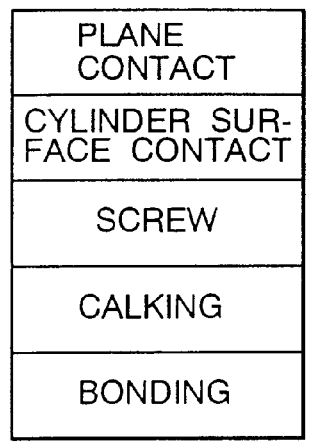
FIG. 6 is a drawing showing an example of the kind of connection relation used by the parts removal order creation apparatus shown in FIG. 1.

Connection or mating relation data designates the object part and destination part and inputs each data of the kind, direction, and position of connection or mating relation. The object part and destination part are designated by inputting the part name by the keyboard or designating the part by the mouse from the assembled shape on the screen. The kind of connection or mating relation is inputted, for example, by displaying the kind of connection or mating relation on the screen of the display unit as a menu as shown in FIG. 6 and selecting the kind from the displayed items using the mouse. The direction is inputted by instructing the shape element or inputting the vector value or the axis of coordinates. The position of connection or mating relation is inputted, for example, by designating the shape element on the screen of the display unit.

Figure 7:
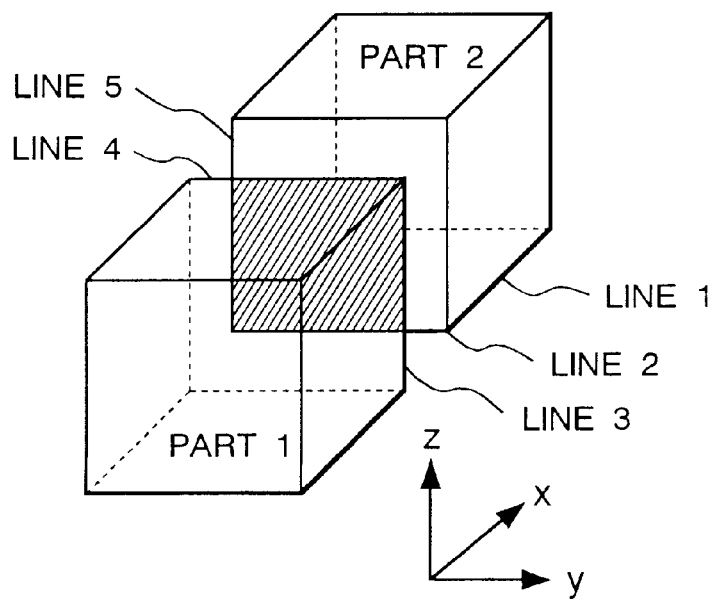
FIG. 7 is a perspective view showing a machine product for explaining input of connection relation data of the parts removal order creation apparatus shown in FIG. 1.

Next, the connection or mating relation data input method will be explained using an example of the machine product shown in FIG. 7 which is in plane contact on the hatched portion.

Firstly, the part names of a part 1 which is an object part and a part 2 which is a destination part are inputted from the keyboard or inputted by designating the shape on the screen by the mouse. Next, to input the kind of connection relation, "Plane contact" is selected from the menu shown in FIG. 6. Furthermore, the direction of connection relation is inputted. When the element indicating the direction is to be designated in this input of direction, a straight line parallel to the normal vector of the contact surface, for example, a line 1 is designated. However, since the direction is not found only by designating the line, it is necessary to make a decision such as assuming the end point closer to the designated position as an end point. When the direction is to be inputted by a vector value, (1, 0, 0) is inputted and when the direction is to be inputted by an axis of coordinates, "x" is inputted. The position of connection relation is inputted finally. In the case of the example shown in FIG. 7, a line 2, a line 3, a line 4, and a line 5 constituting the boundary line of plane contact are instructed.

The plane contact and cylinder surface contact among the connection relation data can be detected from shape data indicating the shape of each part and arrangement data indicating the arrangement position of each part as specified below, so that the detection result by this method may be inputted.

Figure 8:
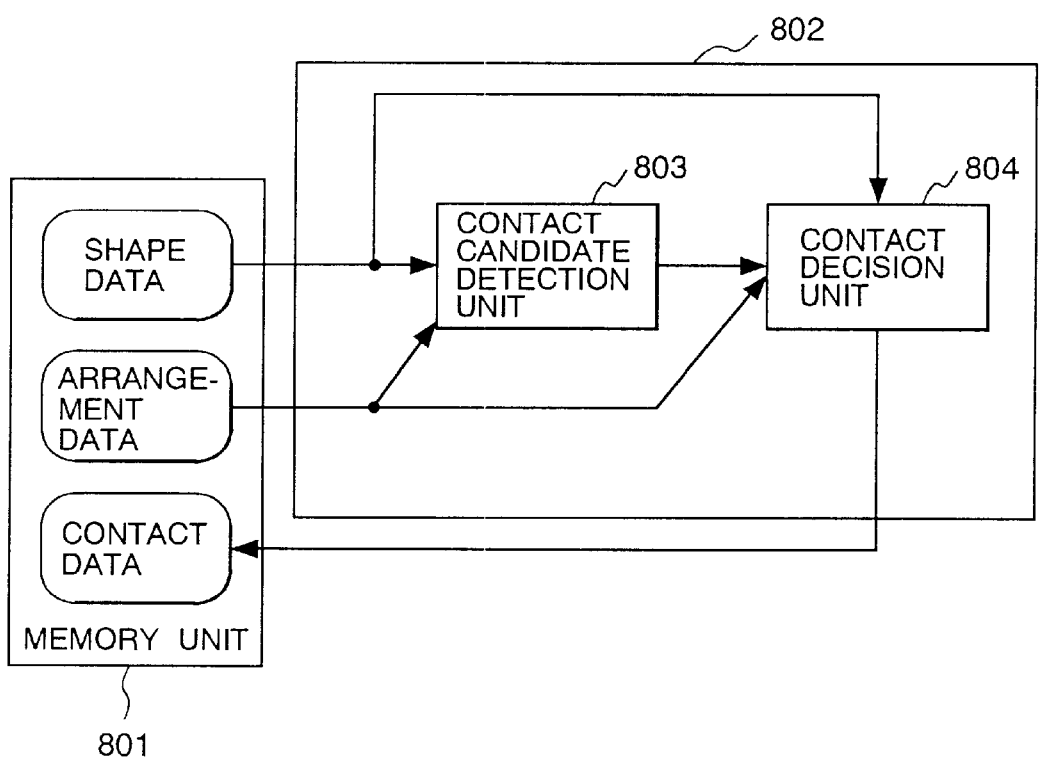
FIG. 8 is a function block diagram showing an example of a method for detecting plane contact and cylinder surface contact among connection relation data by the parts removal order creation apparatus shown in FIG. 1.

Namely, as shown in FIG. 8, a memory unit 801 for storing shape data, arrangement data, and contact data and a contact detection unit 802 for detecting the contact relation are provided and a contact candidate detection unit 803 for detecting a candidate of a part to come in contact and a contact decision unit 804 for deciding the contact relation of each part are provided inside the contact detection unit 802. The contact candidate detection unit 803 detects a combination of candidates of a part capable of coming in contact from the shape data and arrangement data of each part and the contact decision unit 804 detects plane contact and cylinder surface contact from a combination of parts detected by the contact candidate detection unit 803.

Figure 9:
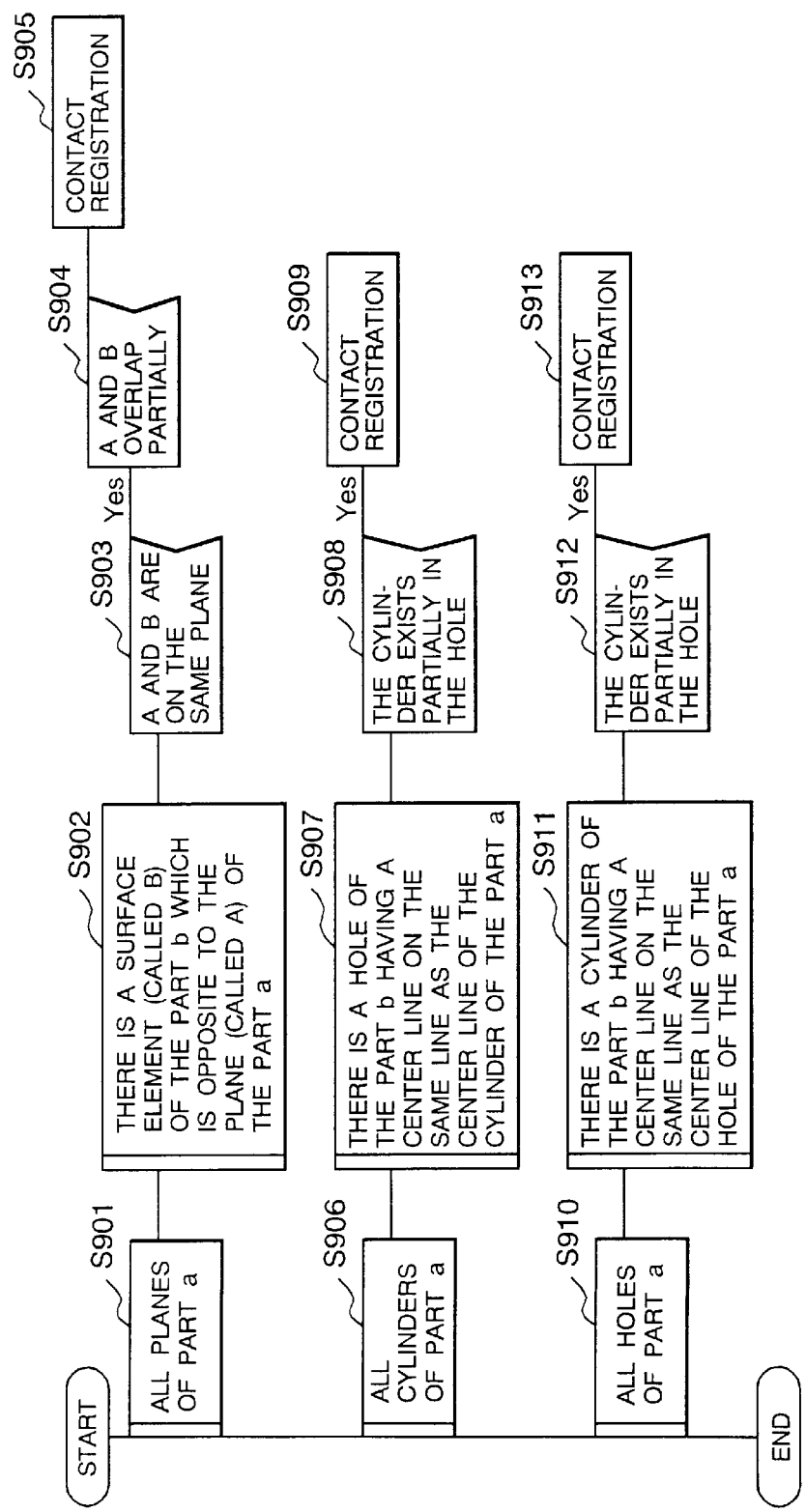
FIG. 9 is a PAD diagram showing a contact decision operation of the contact decision unit shown in FIG. 8.

The contact decision operation of the contact decision unit 804 will be explained by referring to the PAD diagram shown in FIG. 9.

Firstly, a combination of parts to be detected is assumed as a combination of a part a and a part b. At first, all the planes of the part a are set as an object (Step S901), and the planes of the part a are assumed as A, and all the surfaces of the part B whose normal vector is in the direction opposite to the normal vector of the planes A are obtained (Step S902). Next, whether each of plane A and plane B are on the same plane or not is decided (Step S903). With respect to the planes A and B existing on the same plane, whether there are portions in them which are overlapped with each other or not is decided (Step S904). The plane A and plane B having portions which are overlapped with each other are assumed to be in contact with each other and registered in the memory unit 801 (Step S905).

Next, all the cylinders of the part a are set as an object (Step S906) and all the holes of the part b whose center lines are on the same line as the center lines of the cylinders of the part a are obtained (Step S907). Whether there is any cylinder of the part a which exists partially in an obtained hole or not is decided (Step S908). When there is a cylinder which exists partially in a hole, the cylinder and hole are registered in the memory unit 801 on the assumption that they are in contact relation (Step S909).

Finally, all the holes of the part a are set as an object (Step S910) and all the cylinders of the part b whose center lines are on the same line as the center lines of the holes of the part a are obtained (Step S911). Whether there is any obtained cylinder which exists partially in a hole of the part a or not is decided (Step S912). When there is a cylinder which exists partially in a hole, the cylinder and hole are registered in the memory unit 801 on the assumption that they are in contact relation (Step S913).

Figure 10:
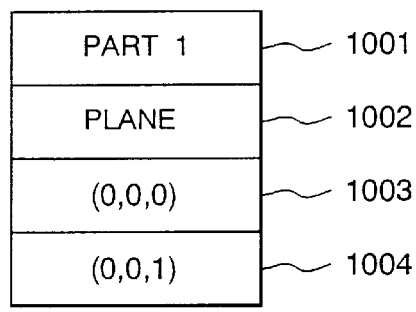
FIG. 10 is a drawing showing an example of parts split data used by the parts removal order creation apparatus shown in FIG. 1.

Parts split data to be inputted by the parts split input unit 105 is inputted by designating the part and split surface. For example, when a part is to be split by a plane, the parts split data comprises, as shown in FIG. 10, character string data 1001 indicating the part name of a part to be split, character string data 1002 indicating the kind of split surface, position data 1003 indicating an optional point on the plane which is the split surface, and coordinate data 1004 indicating the normal vector of the plane which is the split surface. When the split surface is a plane like this, as geometric information of the split surface, the position data 1003 of a point on the split surface and the coordinate data 1004 of the normal vector of the split surface are used.

Figure 11:
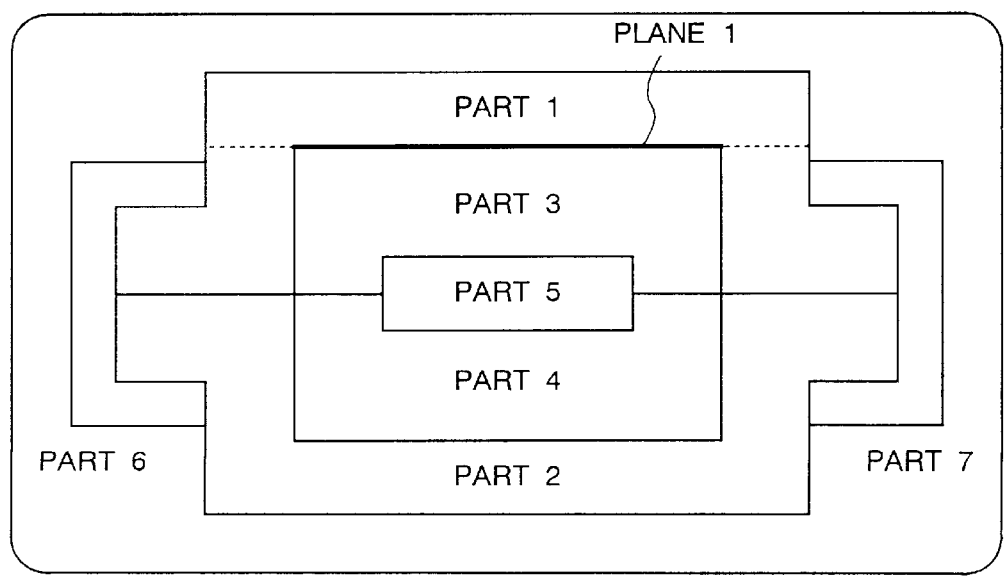
FIG. 11 is a plan view showing a machine product for explaining input of parts split data of the parts removal order creation apparatus shown in FIG. 1.

Parts split data is inputted, as mentioned above, by designating the part and split surface. However, the part is designated by inputting the part name by the keyboard or by designating the part by the mouse from the shape of an assembled machine product on the screen of the display unit. The split surface is designated by inputting the kind of split surface, coordinate value, and vector so as to uniquely decide the split surface. Or, the split surface is designated by designating a plane or point on the screen of the display unit. For example, when the split surface is a plane and is to be inputted by inputting a numerical value, the split surface is inputted by inputting the coordinates and normal vector of an optional point on the split surface or by inputting the coordinates of optional three points which are not located on the same line on the split surface. Or, the split surface is inputted by designating an element or point of a line segment or plane on the screen of the display unit by the mouse. The designation method in this case will be explained by referring to the example of machine product shown in FIG. 11. The drawing shown in FIG. 11 is displayed two-dimensionally for simple explanation. However, the concrete machine product is in a three-dimensional shape having the thickness in the depth direction and each line on the screen actually indicates also a plane perpendicular to the screen.

In this case, a method for inputting the split surface by designating the surface of the shape of each part as an element for designating split will be explained. When the part 1 is to be split by the plane indicated by the broken line shown in FIG. 11, the plane 1 indicated by the thick line shown in the drawing is on the same plane as the split surface. By designating the plane 1 as a split surface, the split surface can be decided uniquely. Therefore, when the plane 1 is instructed, the split surface is inputted. As other methods for designating the split surface by designating an element or point on the screen, there are a method for designating three points on the screen and a method for designating a line parallel with the normal vector of the split surface and an optional point on the split surface available.

The split connection relation creation unit 102 creates split connection relation data indicating the connection relation after parts split from connection relation data inputted by the connection relation input unit 101 and parts split data inputted by the parts split input unit 105.

Figure 12:
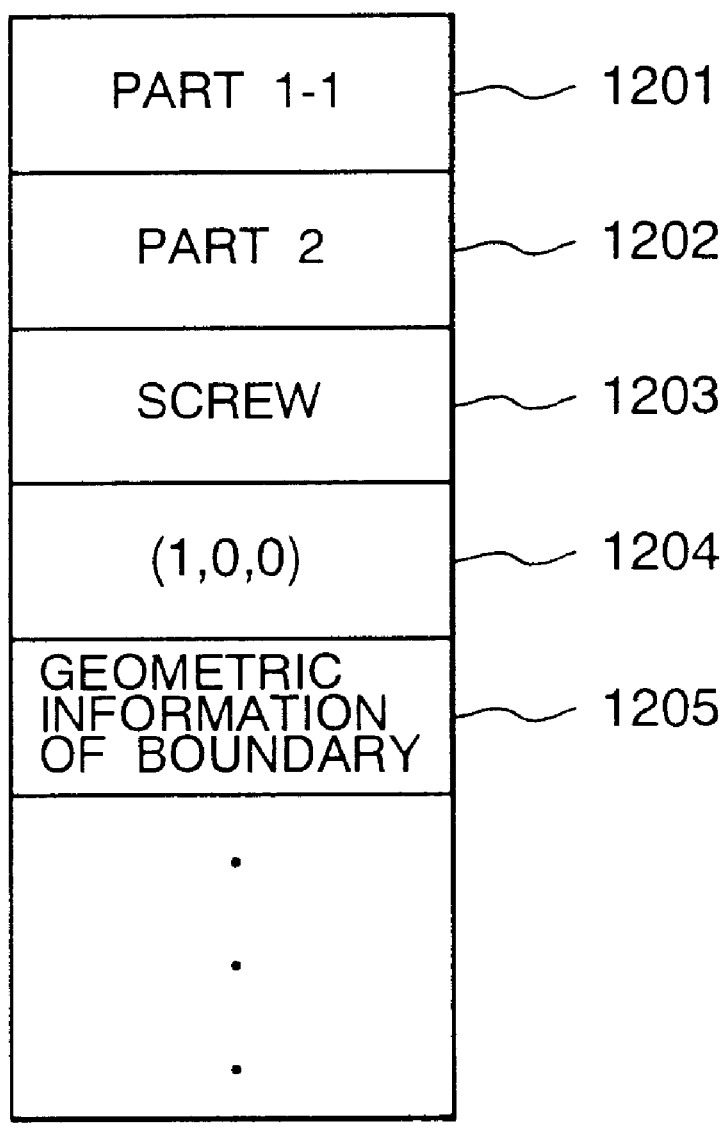
FIG. 12 is a drawing showing an example of split connection data created by the parts removal order creation apparatus shown in FIG. 1.

The split connection relation data represents each portion obtained by splitting a part as a part respectively. For example, when the part 1 is split into two parts, the split parts are assumed as part 1-1 and part 1-2. FIG. 12 shows an example of split connection relation data. The file format of this data is the same as the file format of connection relation data and the split connection related data comprises character string data 1201 indicating the object part name, character string data 1202 indicating the destination part name, character string data 1203 indicating the kind of connection relation, numerical data 1204 indicating the direction of connection relation, and geometric information data 1205 indicating the position of connection relation.

Figure 13:
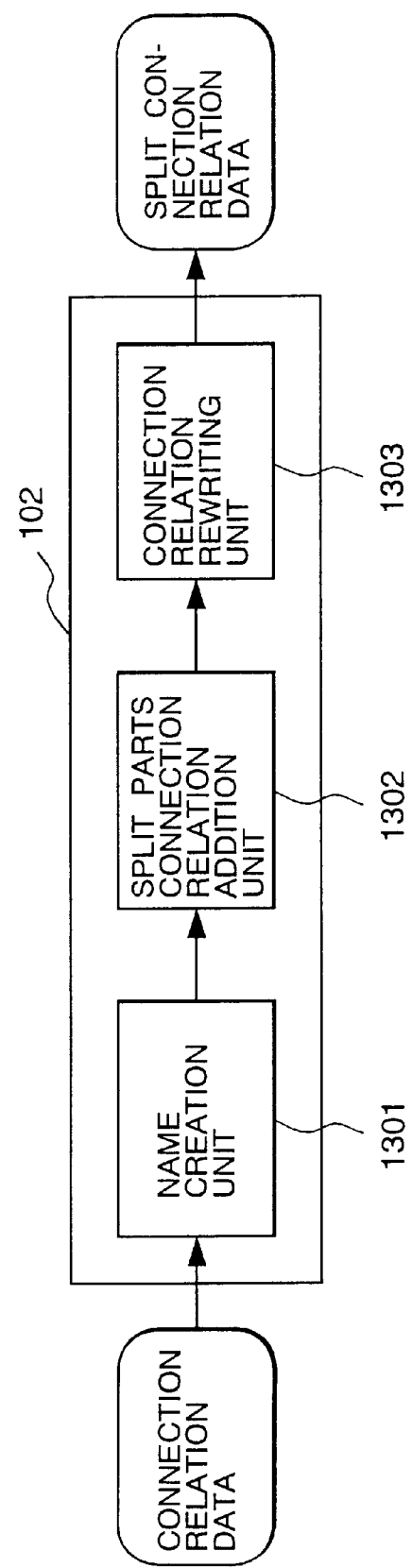
FIG. 13 is a function block diagram showing the concrete function constitution of the split connection relation creation unit of the parts removal order creation apparatus shown in FIG. 1.

The split connection relation creation unit 102 has a function block constitution actually as shown in FIG. 13. In the drawing, a name creation unit 1301 is a function block for assigning the part name to each portion as a part after a part to be split is split from parts split data inputted by the parts split input unit 105. A split parts connection relation addition unit 1302 is a function block for adding the connection relation between parts formed by split which are assigned with part names by the name creation unit 1301 to connection relation data inputted by the connection relation input unit 101. A connection relation rewriting unit 1303 is a function block for rewriting the connection relation by rewriting the connection relation of parts before splitting from the connection relation added by the split parts connection relation addition unit 1302 to the connection relation inputted by the connection relation input unit 101 and from the parts split data inputted by the parts split input unit 105 and for outputting the connection relation data created by this rewriting as split connection relation data.

Figure 14B:
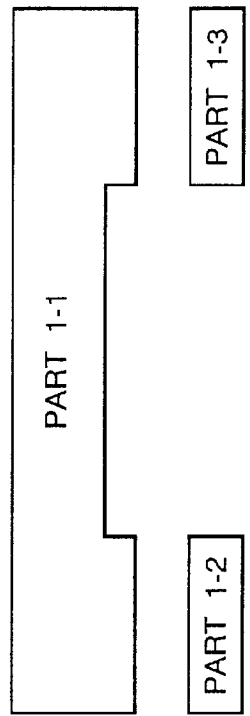
FIG. 14 is a drawing for explaining the parts split operation of the split connection relation creation unit shown in FIG. 13.
Figure 14A:
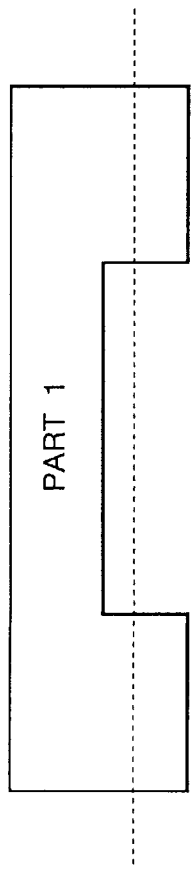

Next, the operation of the split connection relation creation unit 102 will be explained by referring to the example of splitting the part 1 into the part 1-2 and the part 1-3 which is shown in FIG. 14. The shape of part shown in FIG. 14 is actually a solid having a thickness in the depth direction. However, it is displayed two-dimensionally in the drawing for simple explanation. FIG. 14(a) shows the part 1 before splitting and the part 1 is to be split by the plane indicated by the broken line. FIG. 14(b) shows the part 1-1, the part 1-2, and the part 1-3 after splitting.

Figure 15:
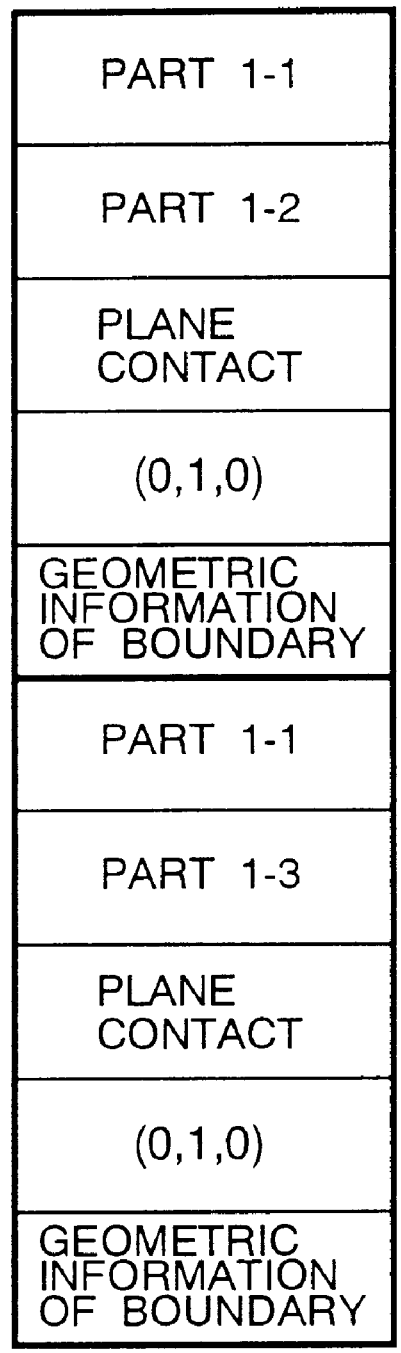
FIG. 15 is a drawing showing an example of connection relation data to be added by the split parts connection relation addition unit in the split connection relation creation unit shown in FIG. 13.
Figure 16:
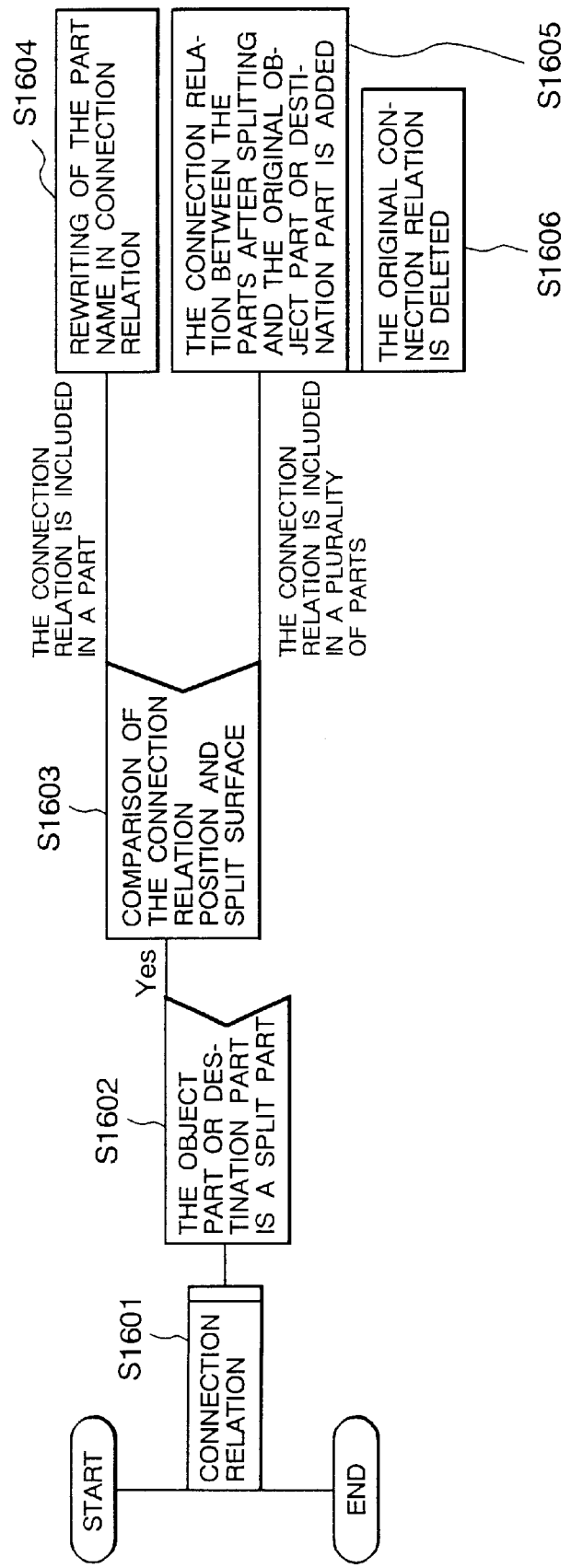
FIG. 16 is a PAD diagram showing the operation of the connection relation rewriting unit in the split connection relation creation unit shown in FIG. 13.

Firstly, the part 1 is split by the name creation unit 1301 and the parts after splitting are given names of part 1-1, part 1-2, and part 1-3 respectively. Next, connection relation data between the parts after splitting is added by the split parts connection relation addition unit 1302. In FIG. 14, the connection relation data between the part 1-1 and the part 1-2 and the connection relation data between the part 1-1 and the part 1-3 are added as shown in FIG. 15. The connection relation rewriting unit 1303 performs the process explained below using the PAD diagram shown in FIG. 16.

Figure 17A:
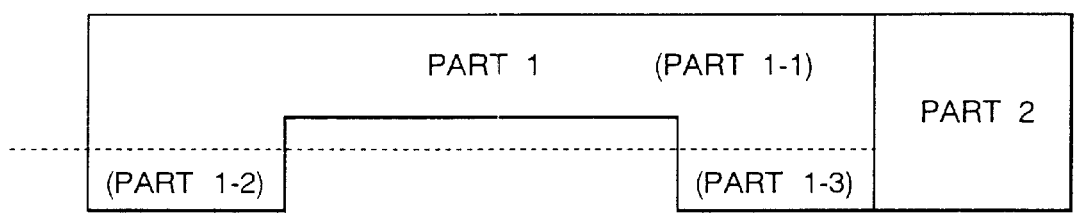
FIG. 17 is a drawing showing an example of the parts to be split by the parts removal order creation apparatus shown in FIG. 1 and the connection relation data thereof.
Figure 17B:
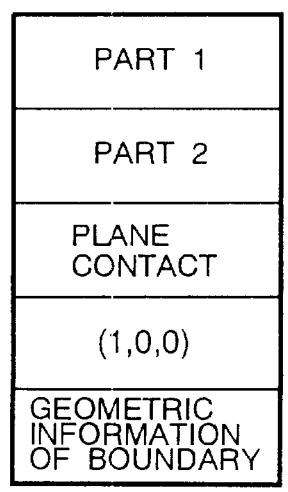
Figure 18:
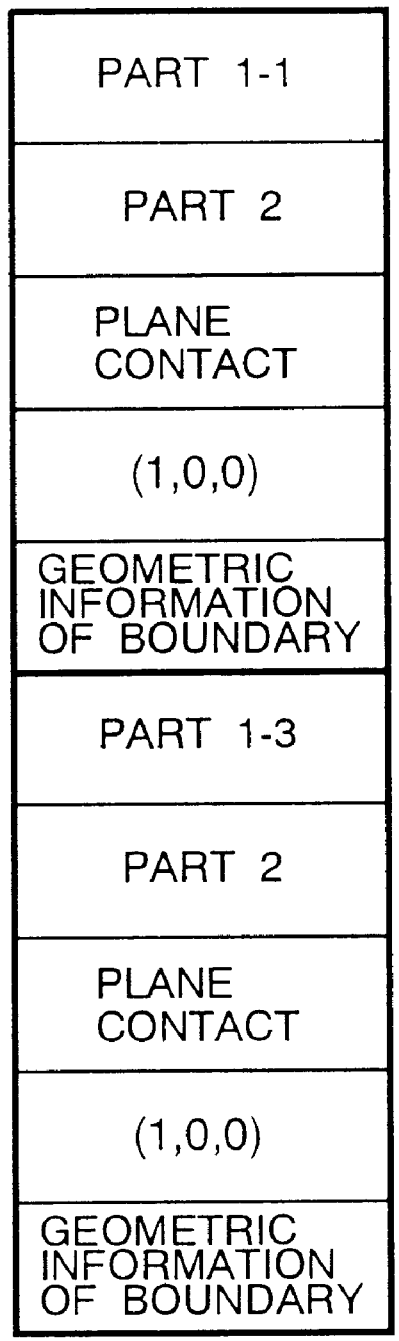
FIG. 18 is a drawing showing the connection relation data after the parts shown in FIG. 17 are split.

Namely, firstly, all connection relations are set as an object (Step S1601) and whether the object part or destination part is a split part or not is decided by referring to parts split data (Step S1602). When the object part or destination part is a split part, the position of connection relation and the split surface are compared (Step S1603). When it is decided as a result of comparison that the connection relation is included in a part after splitting, the part name in this connection relation is rewritten to the part name of the part including the connection relation (Step S1604). When it is decided that the connection relation is included in a plurality of parts after splitting, the connection relation between the parts including respective connection relations after splitting and the original object part or destination part is added (Step S1605) and the original connection relation is deleted (Step S1606). For example, when the part 1 having the connection relation as shown in FIG. 17(b) in the shape as shown in FIG. 17(a) is split by the plane indicated by the broken line shown in FIG. 17(a) (the part names after splitting are indicated in the parentheses shown in FIG. 17(a)), the connection relation after splitting is included in the part 1-1 and the part 1-3 after splitting. Therefore, the connection relation shown in FIG. 18 is added and the original connection relation is deleted.

The removal order creation unit 103 creates removal order data indicating the order including parts split until at least the target part is removed from the split connection relation data created by the split connection relation creation unit 102 and the target part data inputted by the target parts input unit 106.

Figure 19:
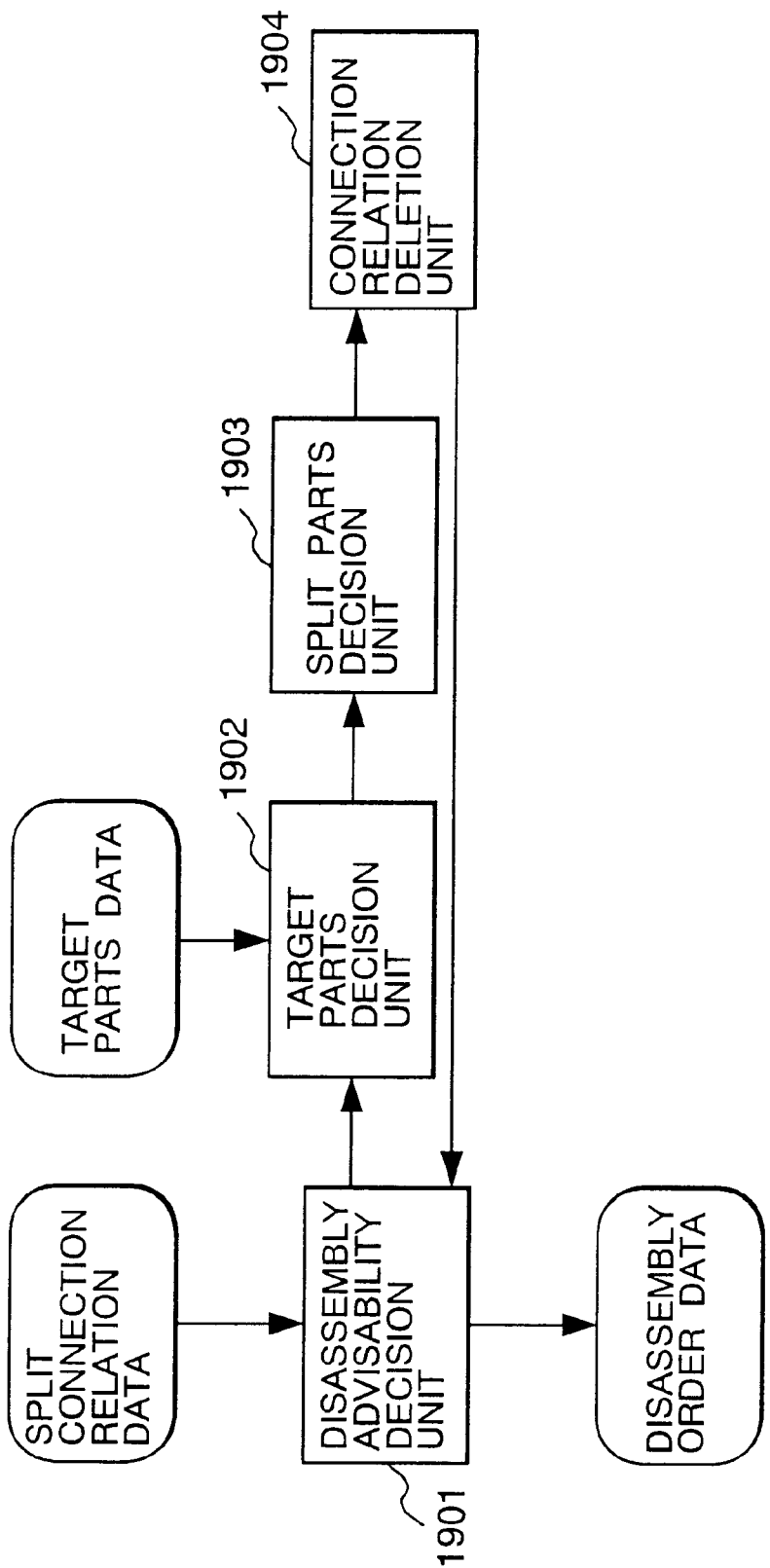
FIG. 19 is a function block diagram showing the concrete function constitution of the removal order creation unit in the parts removal order creation apparatus shown in FIG. 1.

FIG. 19 is a function block diagram showing the concrete function constitution of the removal order creation unit 103. In the drawing, a disassembly advisability decision unit 1901 decides whether each unit can be disassembled or not on the basis of the split connection relation data. A target part decision unit 1902 decides whether the part which is decided as capable of disassembling by the disassembly advisability decision unit 1901 is a target part or not by referring to the target part data. After deciding the target part, the target part decision unit 1902 decides whether there is another target part or not. When there is no more target part, the target part decision unit 1902 finishes the operation of the removal order creation unit 103. A split parts decision unit 1903 decides whether the part which is decided as capable of disassembling is a split part or not from the name of the part. When the part is a split part, the split parts decision unit 1903 inserts an operation of parts split before the part which is decided as capable of disassembling in the removal order. For example, when the part 1-1 produced by splitting the part 1 is decided as capable of disassembling, the parts removal order is "splitting of part 1" and "part 1-1". If this occurs, the split parts decision unit 1903 remembers that "splitting of part 1" is put in the removal order and will not perform a process of putting the split operation in the removal order even if another part obtained by splitting the part 1 appears thereafter. The reason is that the part 1 is already split. A connection relation deletion unit 1904 deletes the connection relation of a disassembled part. The reason is that if the connection relation of a disassembled part is left, the operation of the removal order creation unit 103 is performed repeatedly and will not end.

The removal order creation unit 103 decides advisability of disassembly for all object parts when the aforementioned units operate sequentially and discriminate whether a part capable of disassembling is a target part or not. When the part capable of disassembling is a split part, the removal order creation unit 103 performs an operation of inserting the operation of parts split into the removal order and deleting the connection relation of the disassembled part until the target part is disassembled or parts capable of disassembling are exhausted and creates the removal order.

Figure 20A:
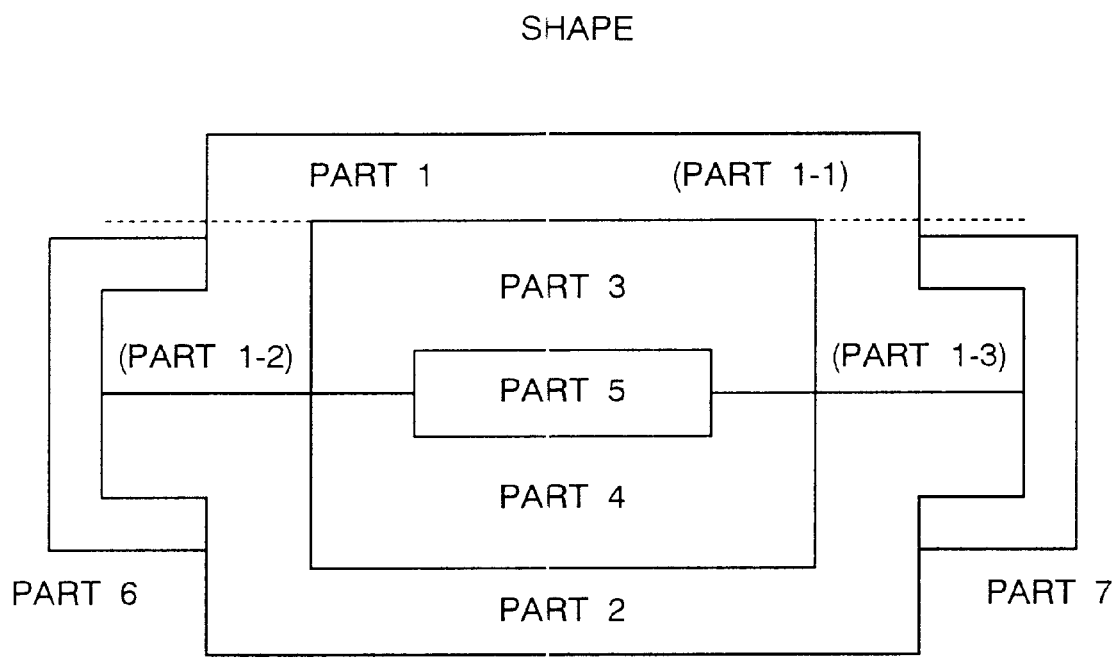
FIG. 20 is a plan view showing a machine product which is an object of creation of the removal order by the removal order creation unit shown in FIG. 19.
Figure 20B:

The process of the removal order creation unit 103 will be explained more concretely by referring to an example of a machine product having the shape and target part data shown in FIG. 20. The machine product is actually in a three-dimensional shape. However, it is displayed two-dimensionally in the drawing so as to make the explanation clearly understandable. It is assumed that no part can move in the depth direction of the drawing. The broken line shown in the drawing indicates the split surface. The disassembly advisability decision unit 1901 decides advisability of disassembly of the parts in the order of part 1-1, part 1-2, part 1-3, part 2, part 3, - - - . The target part is part 5.

Figure 21:
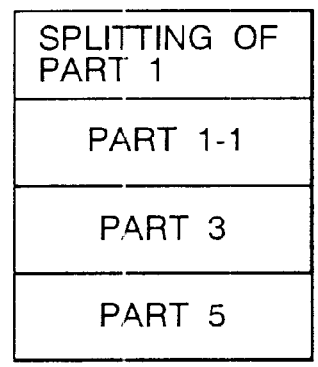
FIG. 21 is a drawing showing a data file showing the removal order created by the removal order creation unit shown in FIG. 19 for the machine product shown in FIG. 20.

Firstly, the part 1-1 is decided as capable of disassembling by the disassembly advisability decision unit 1901. Next, it is decided as not a target part by the target parts decision unit 1902. Then, it is decided as a split part by the split parts decision unit 1903 and the step of "splitting of part 1" is inserted before the parts removal order. Namely, at this point of time, the parts removal order is "splitting of part 1" and "part 1-1". Next, the connection relation relating to the part 1-1 is deleted by the connection relation deletion unit 1904. In this example, the connection relations between the part 1-1 and the part 1-2, between the part 1-1 and the part 1-3, and between the part 1-1 and the part 2 are deleted. The next part 1-2 is decided as incapable of disassembling by the disassembly advisability decision unit 1901. The next part 1-3 is also decided as incapable of disassembling by the disassembly advisability decision unit 1901. Furthermore, the next part 2 is also decided as incapable of disassembling by the disassembly advisability decision unit 1901. The next part 3 is decided as capable of disassembling by the disassembly advisability decision unit 1901. The part 3 is decided as not a target part by the target parts decision unit 1902 and decided as not a split part by the split parts decision unit 1903. The connection relations between the part 3 and the part 1-2, between the part 3 and the part 1-3, between the part 3 and the part 4, and between the part 3 and the part 5 are deleted by the connection relation deletion unit 1904. The next part 4 is decided as incapable of disassembling by the disassembly advisability decision unit 1901. The next part 5 is decided as capable of disassembling by the disassembly advisability decision unit 1901 and decided as a target part by the target parts decision unit 1902. The target part in this example is only the part 5, so that it is decided that no target part is left and the operation of the removal order creation unit 103 ends. The parts removal order is "splitting of part 1", "part 1-1", "part 3", and "part 5". Removal order data is indicated by arranging a character string of the part name of a part to be disassembled and a character string of split sequentially. FIG. 21 shows a file of the removal order data of the machine product shown in FIG. 20 created by the removal order creation unit 103 like this.

Figure 22:
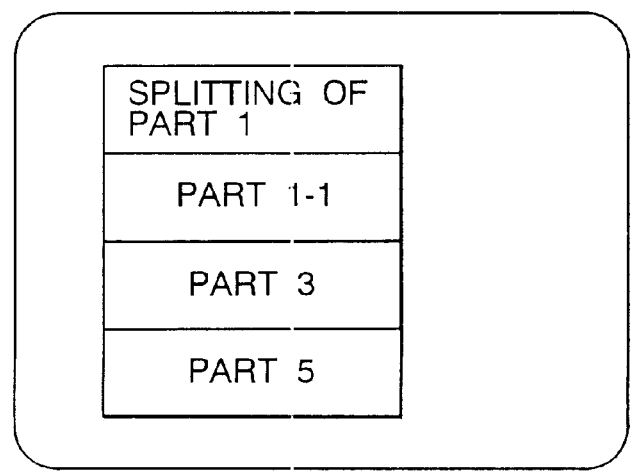
FIG. 22 is a drawing showing an example of a removal order list to be displayed on the display unit in the parts removal order creation apparatus shown in FIG. 1.
Figures 23A, 23B, 23C, 23D, 23E:
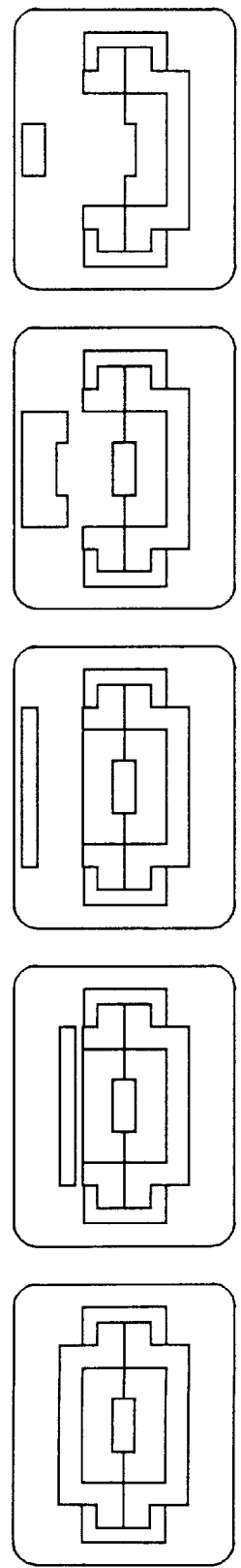
FIG. 23 is a drawing showing an example of an animation showing the removal order to be displayed on the display unit in the parts removal order creation apparatus shown in FIG. 1.

The display unit 104 is a function block for displaying the removal order data created by the removal order creation unit 103 on the display unit such as a display. The display unit 104 displays data, for example, by outputting the removal order as a list as shown in FIG. 22 or by displaying the removal order using an animation as shown in FIG. 23. FIG. 23 shows each screen of an animation displayed on the display unit 104. The screens are displayed sequentially in the order of the screen (a) displaying the assembled status, the screen (b) displaying the status that the part 1 is split, the screen (c) displaying the status that the part 1-1 is removed, the screen (d) displaying the status that the part 3 is removed, and the screen (e) displaying the status that the part 5 is removed.

The connection relation input unit 101, the parts split input unit 105, the target parts input unit 106, and the display unit 104 use the input unit such as the keyboard or mouse and the display unit such as the display as a common hardware resource.

Figure 24:
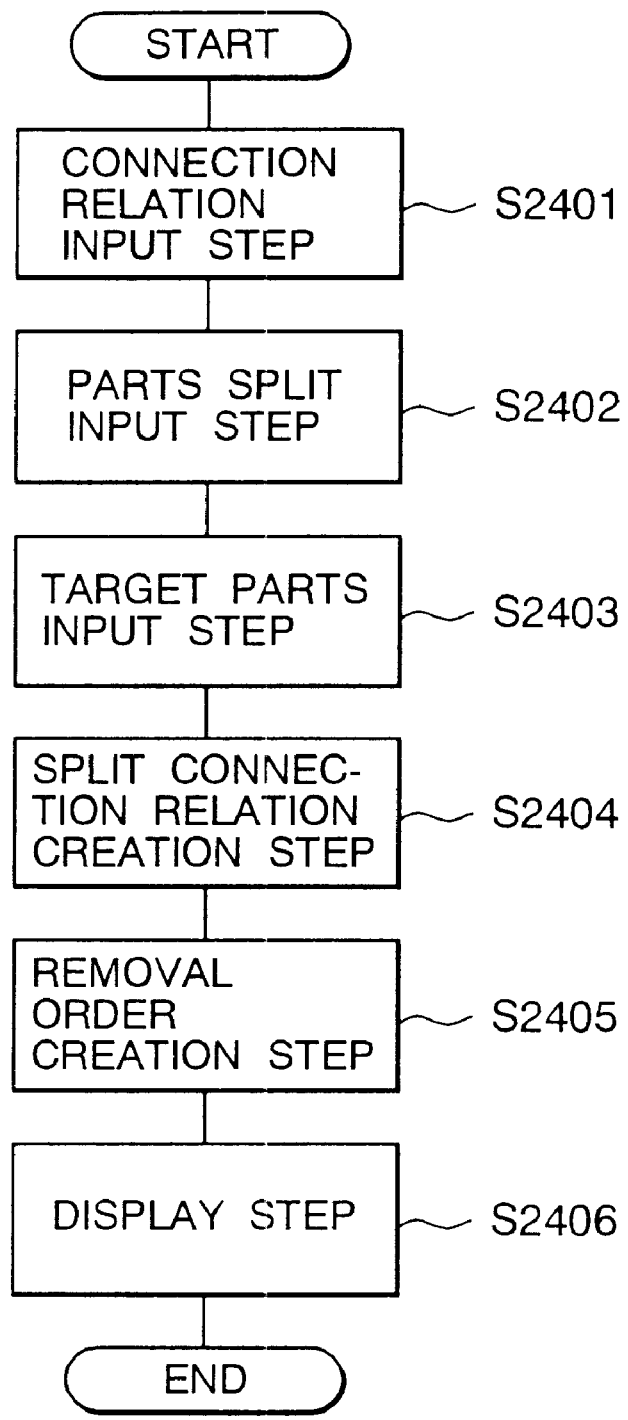
FIG. 24 is a flow chart showing the first embodiment of the parts removal order creation method of the present invention.

FIG. 24 is a flow chart showing the first embodiment of the parts removal order creation method of the present invention.

At the connection relation input step S2401, connection relation data indicating the connection relation between screws and parts in plane contact in the status that a machine product is assembled is inputted to a CAD unit. At the parts split input step S2402, a part to be split and parts split data indicating the split surface are inputted to the same CAD unit. At the target parts input step S2403, target parts data indicating a target part is inputted to the same CAD unit. At the split connection relation creation step S2404, split connection relation data indicating the connection relation after parts split is created using the aforementioned CAD unit from the connection relation data inputted at the connection relation input step S2401 and the parts split data inputted at the parts split input step S2402. At the removal order creation step S2405, removal order data indicating the order until at least the target part including parts split is removed is created using the aforementioned CAD unit from the split connection relation data created at the split connection relation step S2404 and the target parts data created at the target parts input step S2403. At the display step S2406, the removal order data created at the removal order creation step S2405 is displayed on the aforementioned CAD unit.

Figure 25:
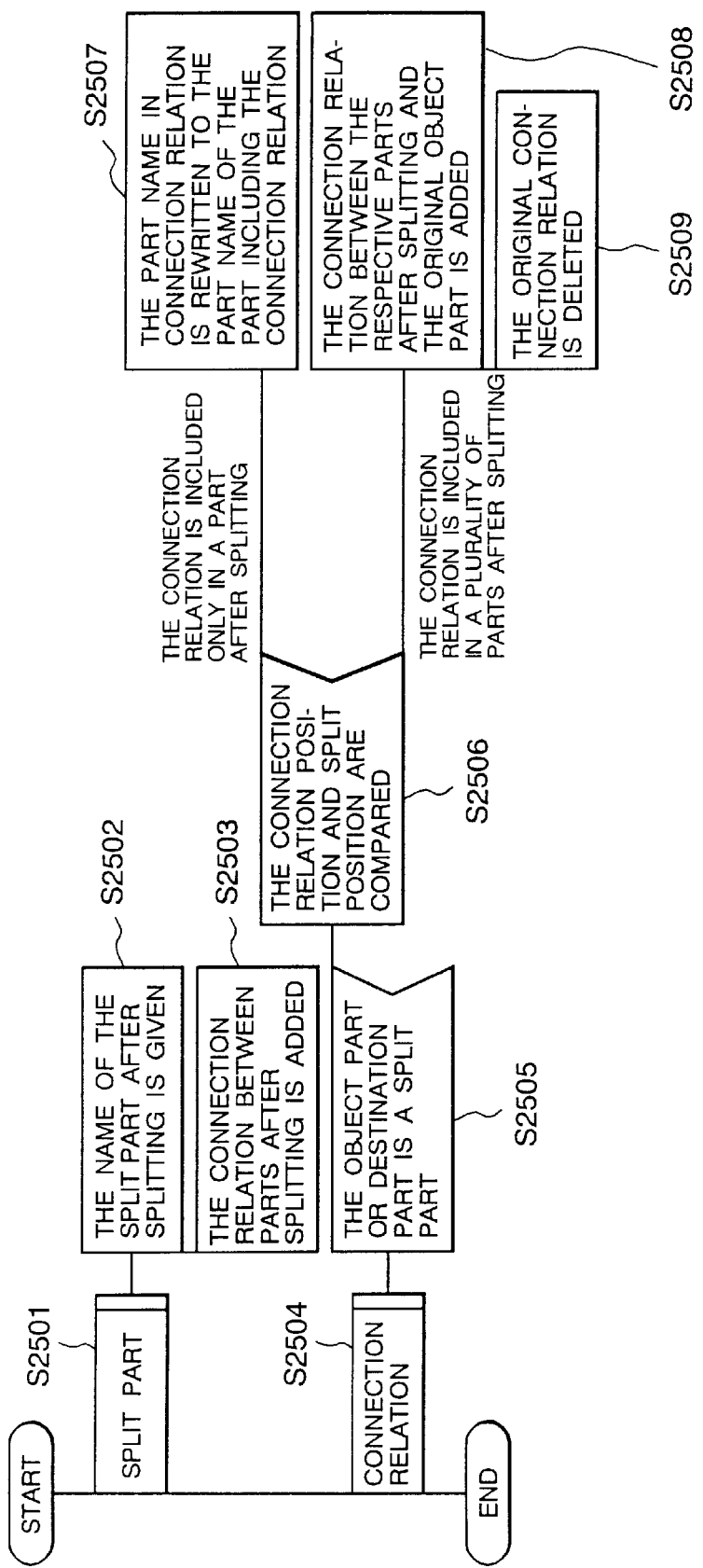
FIG. 25 is a PAD diagram showing the concrete process of the split connection relation creation step in the parts removal order creation method shown in FIG. 24.

At the split connection relation creation step S2404, to be concrete, the process as shown in the PAD diagram in FIG. 25 is performed. Firstly, using all split parts as an object (Step S2501), for example, in the example of parts split shown in FIG. 14, the parts after splitting are named part 1-1, part 1-2, and part 1-3 respectively. Next, the connection relation data between the parts after splitting is added to the memory of connection relation data (Step S2503). In the example shown in FIG. 14, connection relation data as shown in FIG. 15 is added.

Next, using all connection relations as an object (Step S2504), whether the object part or destination part is a split part or not is decided at Step S2505. When it is a split part, the connection relation position and split position of the split part are compared at Step S2506. When the connection relation is included in a part after splitting, the part name in connection relation is rewritten to the part name of the part including the connection relation at Step S2507. When the connection relation is included in a plurality of parts after splitting, the connection relation between the parts including respective connection relations after splitting and the original object part is added at Step S2508 and the original connection relation is deleted at Step S2509. For example, when the part 1 having the connection relation as shown in FIG. 17(b) in the shape as shown in FIG. 17(a) is split, the connection relation after splitting is included in the part 1-1 and the part 1-3 after splitting. Therefore, the connection relation shown in FIG. 18 is added and the original connection relation is deleted.

Figure 26:
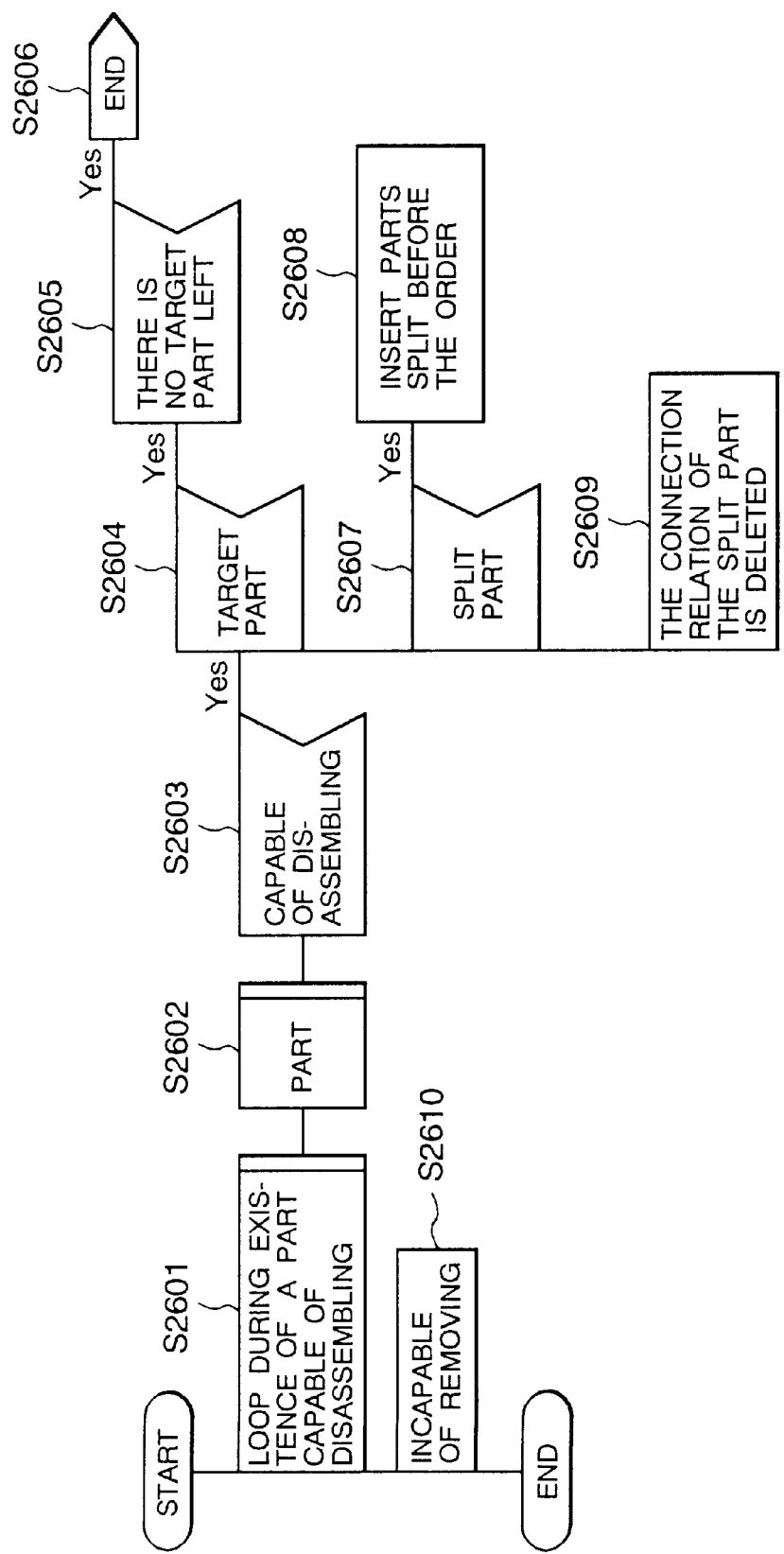
FIG. 26 is a PAD diagram showing the concrete process of the removal order creation step in the parts removal order creation method shown in FIG. 24.

At the removal order creation step S2405, to be concrete, the process as shown in the PAD diagram in FIG. 26 is performed. The concrete process at the removal order creation step S2405 will be explained hereunder by referring to FIG. 26.

Firstly, until all parts capable of disassembling are exhausted (Step S2601), whether all parts (Step S2602) can be disassembled or not is decided (Step S2603). When a part is decided as capable of disassembling, whether the part is a target part or not is decided (Step S2604) by referring to the target parts data inputted at Step S2403. When the part is the target part, whether there is another target part left or not is decided by referring to the target parts data (Step S2605). When there is no target part left, the removal order creation step S2405 ends (Step S2606).

When a part which is decided as capable of disassembling is not a target part or a target part is left, whether the part is a split part or not is decided from the part name (Step S2607). When the part is a split part, the order of the parts split operation is inserted before the order of the part which is decided as capable of disassembling in the removal order (Step S2608). For example, when the part 1-1 produced by splitting the part 1 is decided as capable of disassembling, the parts removal order is "splitting of part 1" and "part 1-1". At Step S2609, the connection relation of the disassembled part is deleted from the connection relation data.

The aforementioned processes are performed until parts capable of disassembling are exhausted. When parts capable of disassembling are exhausted, the removal order creation step S2405 ends on the assumption that the parts are incapable of removal (Step S2610).

The parts removal order creation method of this embodiment can be recorded on a recording medium such as CD-ROM or a floppy disk as a program. In this case, the first embodiment of the program to be recorded on a recording medium is disclosed in the flow chart or the PAD diagrams shown in FIGS. 24 to 26.

Figure 27:
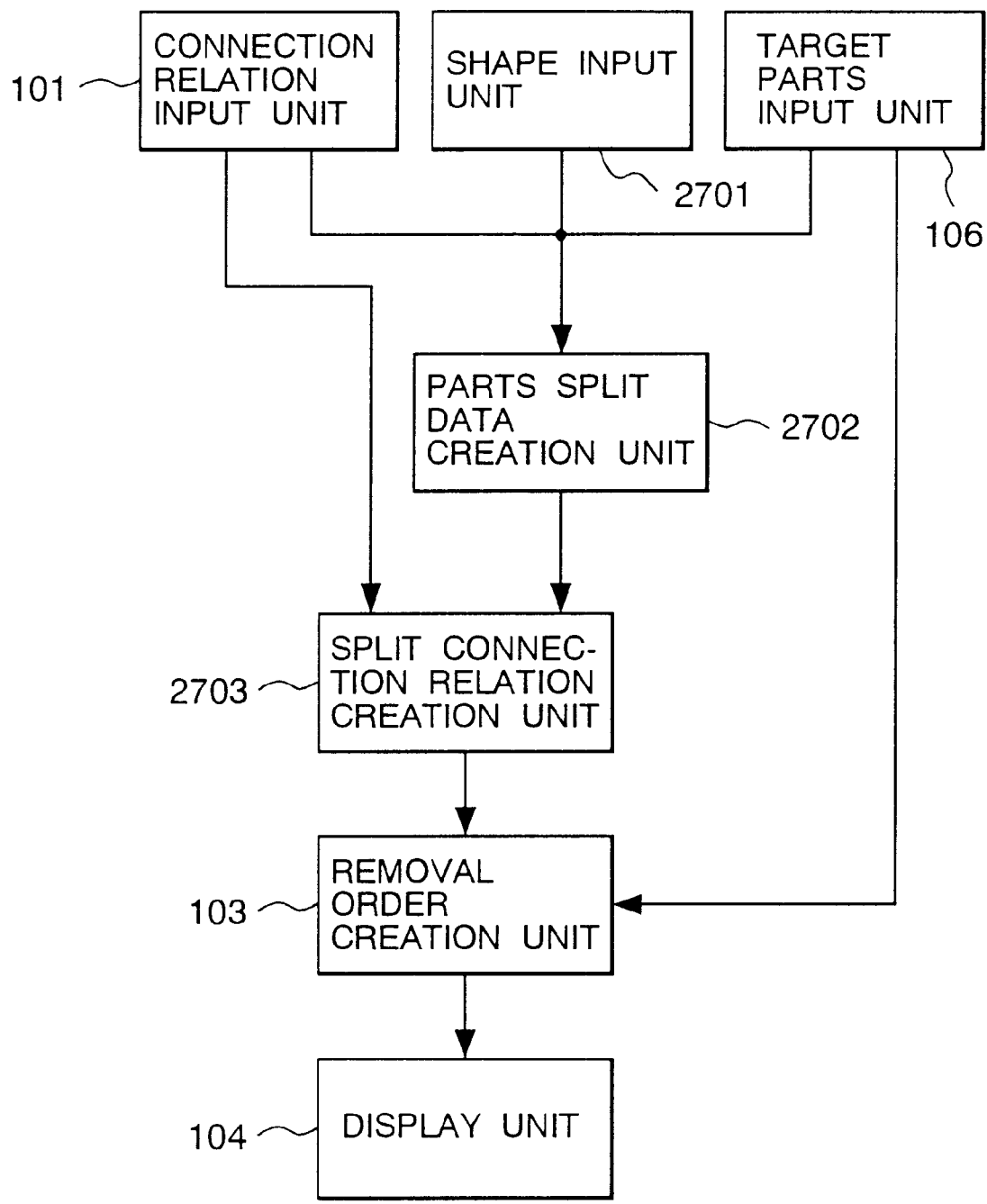
FIG. 27 is a block diagram showing the function constitution of the. second embodiment of the parts removal order creation apparatus of the present invention.

FIG. 27 is a function block diagram showing the function constitution of the second embodiment of the parts removal order creation apparatus of the present invention. In the drawing, each function block showing the same operation as that of the function block of the first embodiment shown in FIG. 1 is assigned with the same number and the explanation thereof is omitted.

Figures 28, 29:
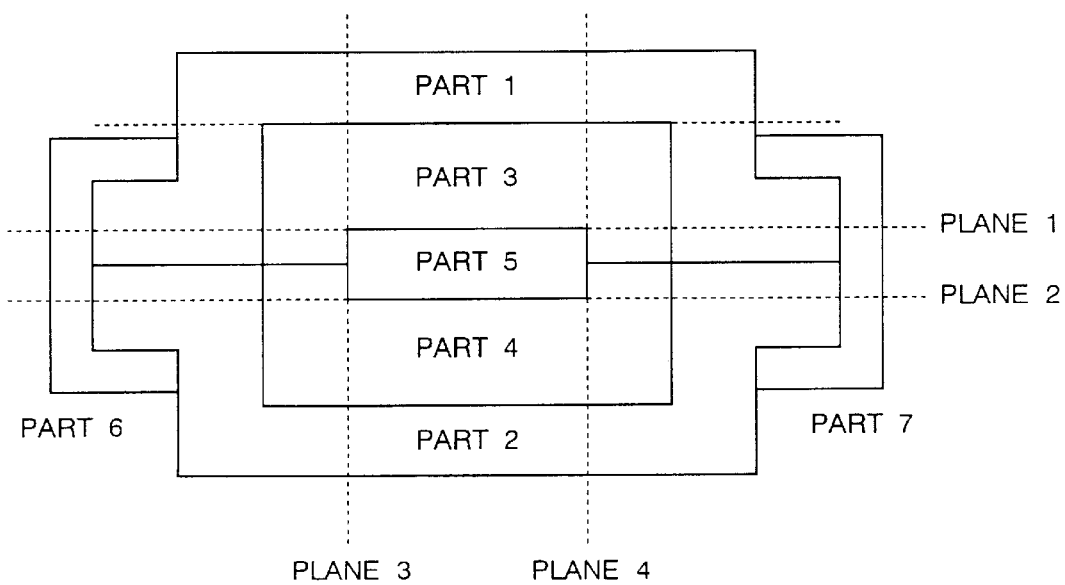
FIG. 28 is a drawing showing the format of shape data inputted by the shape input unit of the parts removal order creation apparatus shown in FIG. 27.
FIG. 29 is a plan view showing a machine product to be split by the parts removal order creation apparatus shown in FIG. 27.

A shape input unit 2701 is a function block for inputting shape data indicating the shape of each part of a machine product using the operation unit such as a keyboard or mouse and the display unit such as a display. FIG. 28 is a drawing showing the format of the shape data inputted by the shape input unit 2701. In this format, a geometric shape 2802 of a part is stored for each part name 2801 such as part 1, part 2, etc. The geometric shape 2802 is information of lines and surfaces constituting the part shape and it is indicated, for example, by coordinate values of the start point and end point of a straight line.

A parts split data creation unit 2702 is a function block for obtaining parts split necessary to remove the target part described in the target parts data from the connection relation data inputted by the connection relation input unit 101, the target parts data inputted by the target parts input unit 106, and the shape data inputted by the shape input unit 2701 and outputting it as parts split data.

A split connection relation creation unit 2703 is a function block for creating split connection relation data indicating the connection relation after parts split from the connection relation data inputted by the connection relation input unit 101 and the parts split data created by the parts split data creation unit 2702.

Next, the process of this embodiment will be explained.

To remove the target part inputted by the target parts input unit 106, it is possible to split another part by the plane in contact with the target part. This embodiment performs such a process. For example, to remove the part 5 which is a target part from the machine product shown in FIG. 29, it is desirable to split the parts 1, 3, 6, and 7 by the plane 1, or split the parts 2, 4, 6, and 7 by the plane 2, or split the parts 1, 2, 3, and 4 by the plane 3, or split the parts 1, 2, 3, and 4 by the plane 4. Data of such split surfaces and parts to be split is created by the parts split data creation unit 2702.

Figure 30A:
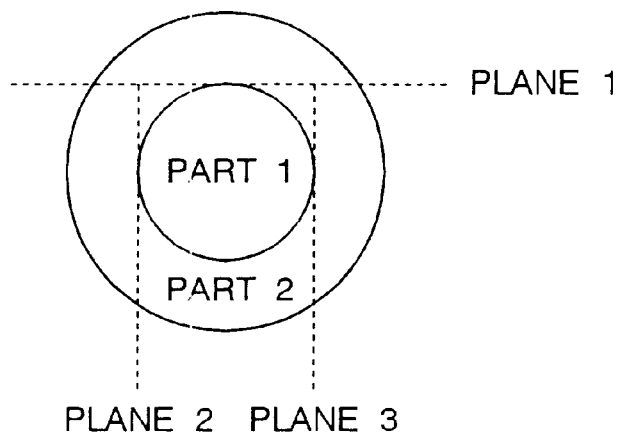
FIG. 30 is a plan view showing an example of removing target parts by splitting a plurality of surfaces by the parts removal order creation apparatus shown in FIG. 27.
Figure 30B:
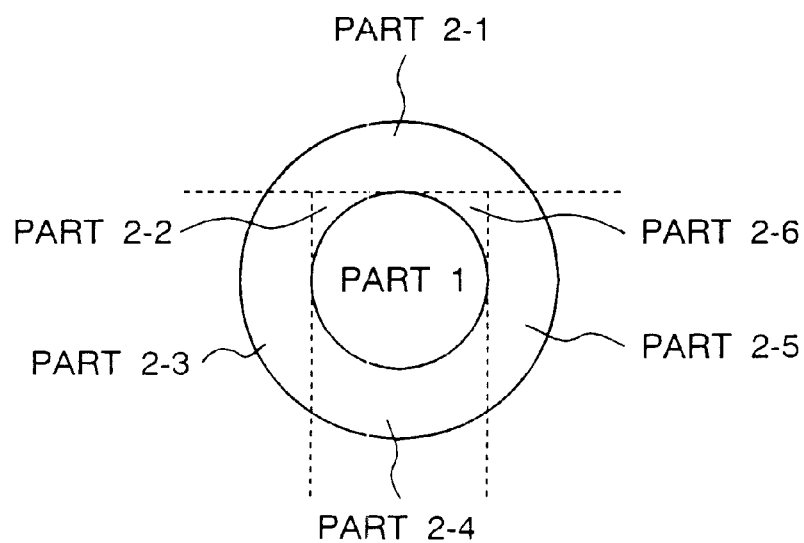

Depending on the shape of a target part or how to decide the split surface, even if the part is split by one surface, the target part may not be removed. If this occurs, it is desirable to perform the split operation several times. FIG. 30 is a drawing showing an example of removing a target part by splitting a plurality of surfaces. FIG. 30(a) shows parts before splitting and split surfaces and FIG. 30(b) shows parts after splitting. The removal order of the target part 1 of this machine product is "splitting part 2 by plane 1", "part 2-1", "splitting part 2 by plane 2", "part 2-3", "part 2-2". "splitting part 2 by plane 3", "part 2-5", "part 2-6", and "part 1".

Figure 31:
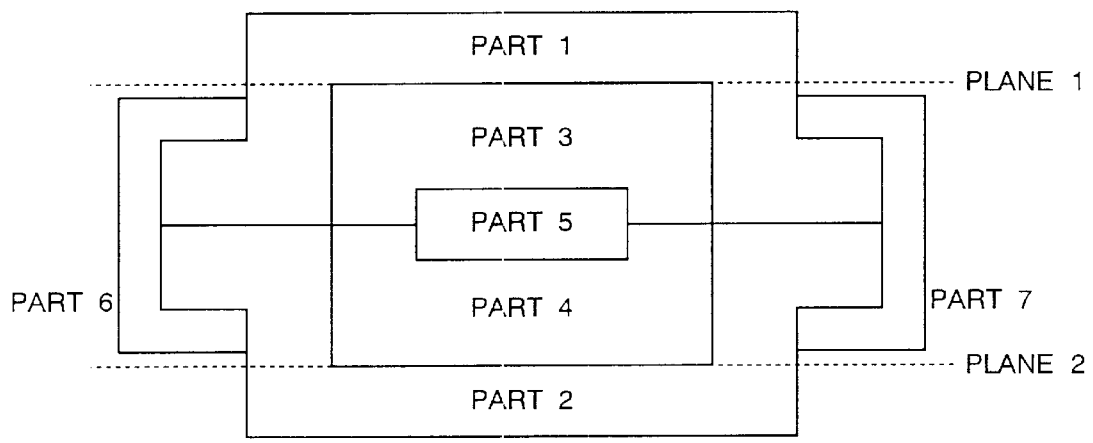
FIG. 31 is a plan view for explaining the principle of calculation of split surfaces by the parts removal order creation apparatus shown in FIG. 27.

However, an error is easily caused in the parts split operation such as cutting, so that when a part is split by the plane in contact with the target part, there is the possibility that the target part is damaged. Therefore, it is possible that the parts split data creation unit 2702 obtains a part causing obstacles to removal of the target part from the connection relation data instead of the target part and obtains the split surface for making the part capable of removal. In the case of the machine product shown in FIG. 29, the parts causing obstacles to removal of the part 5 are the parts 3 and 4 and when one of them is disassembled, the part 5 can be removed. Therefore, in this case, the split surface is obtained so that the part 3 or 4 can be disassembled. The part 3 becomes capable of disassembling by splitting the part 1 by the plane 1 shown in FIG. 31 and the part 4 becomes capable of disassembling by splitting the part 2 by the plane 2 shown in FIG. 31.

Figure 32:
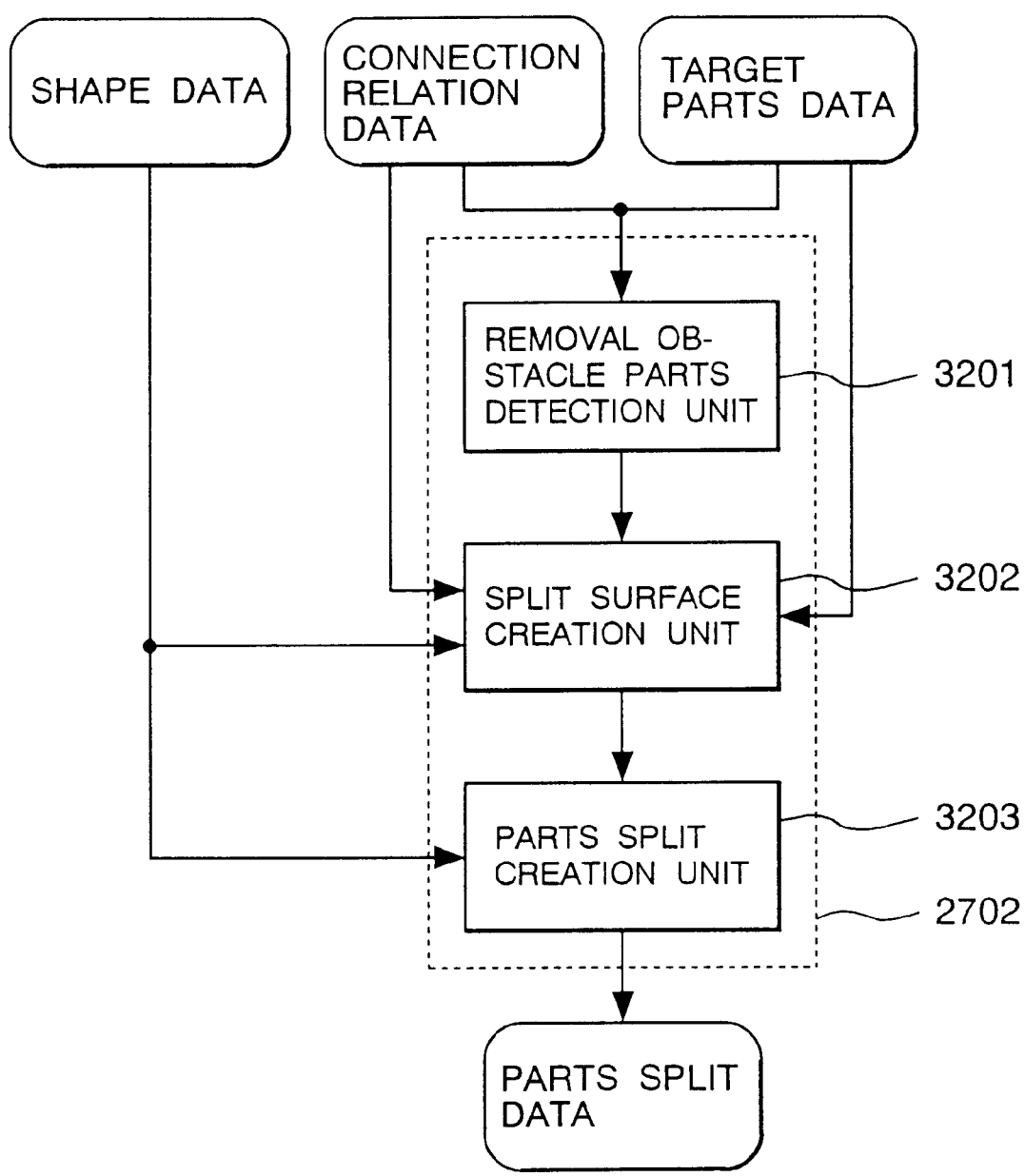
FIG. 32 is a function block diagram showing the concrete function constitution of the parts split data creation unit in the parts removal order creation apparatus shown in FIG. 27.

FIG. 32 is a function block diagram showing the concrete function constitution of the parts split data creation unit 2702. In the drawing, a removal obstacle parts detection unit 3201 is a function block for detecting a part causing obstacles to removal of the target part from the connection relation data inputted by the connection relation input unit 101 and the target parts data inputted by the target parts input unit 106. A part causing obstacles to removal of the target part which is detected by the removal obstacle parts detection unit 3201 will be called a removal obstacle part hereinafter. A split surface creation unit 3202 is a function block for creating a split surface from the removal obstacle parts data detected by the removal obstacle parts detection unit 3201, the connection relation data inputted by the connection relation input unit 101, the shape data inputted by the shape input unit 2701, and the target parts data inputted by the target parts input unit 106. A parts split creation unit 3203 creates parts split data from the split surface data created by the split surface creation unit 3202 and the shape data inputted by the shape input unit 2701.

Figure 33:
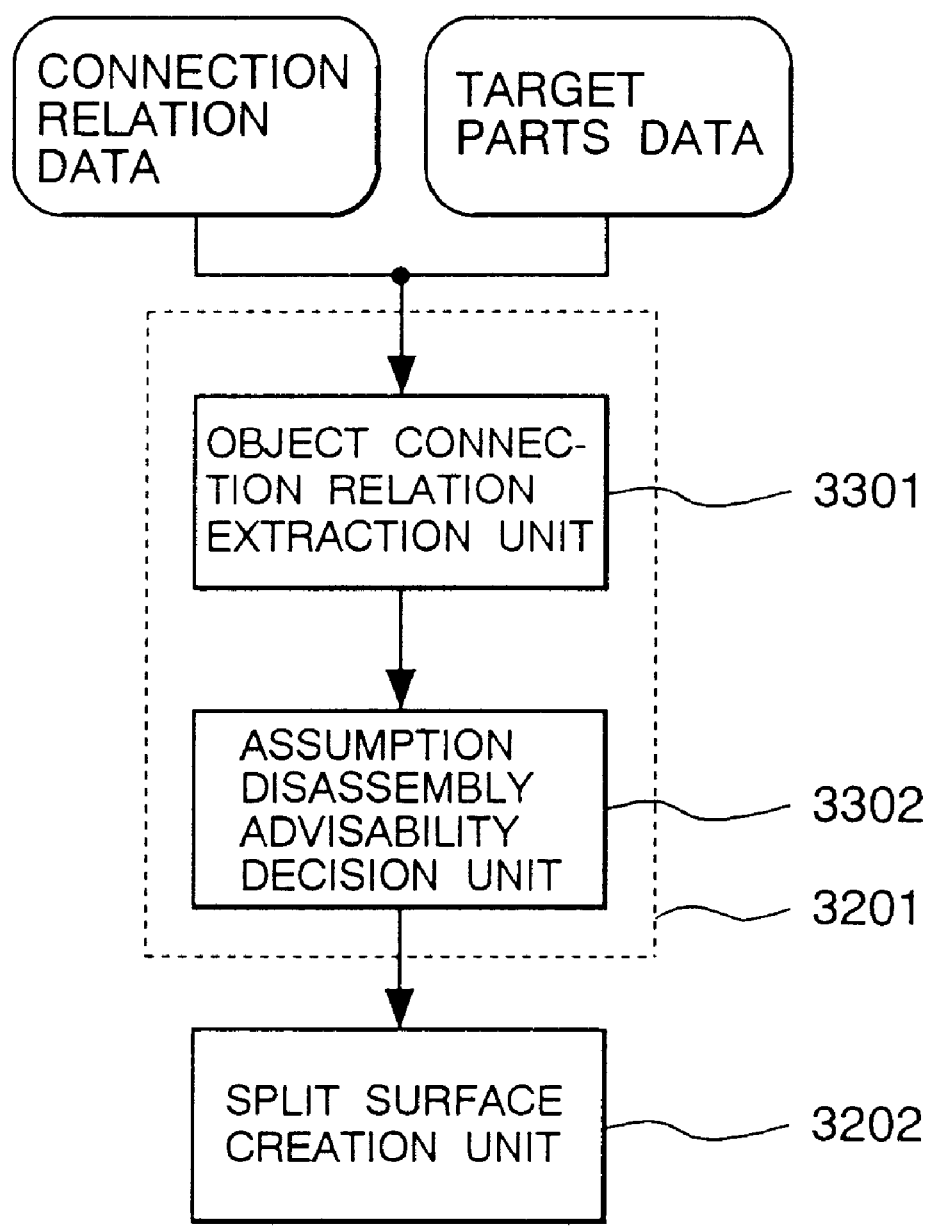
FIG. 33 is a function block diagram showing the concrete function constitution of the removal obstacle parts detection unit in the parts removal order creation apparatus shown in FIG. 27.

FIG. 33 is a function block diagram showing the concrete function constitution of the removal obstacle parts detection unit 3201. In the drawing, an object connection relation extraction unit 3301 is a function block for extracting the connection relation of the object part which is a target part or of the destination part thereof from the connection relation data inputted by the connection relation input unit 101 by referring to the target parts data inputted by the target parts input unit 106. An assumption disassembly advisability decision unit 3302 is a function block for deciding whether the target part becomes capable of disassembling or not when it is assumed that there is no part having a connection relation with the target part from the connection relation extracted by the object connection relation extraction unit 3301 and when the target part is decided as capable of disassembling, outputting the part which is assumed as not existing at that time as a removal obstacle part.

In the case of the machine product shown in FIG. 29, there are six connection relations of the part 5 which is a target part as shown in FIG. 34 and the parts having the connection relation with the target part are the parts 3 and 4. Assuming that there is not the part 3, the part 5 becomes capable of disassembling upward. Therefore, the part 3 is qualified as a removal obstacle part. Depending on the shape of machine product, the target part may become capable of disassembling for the first time when it is assumed that there are not a plurality of parts. If this occurs, a removal obstacle part is qualified as a combination of a plurality of parts.

Figure 35:
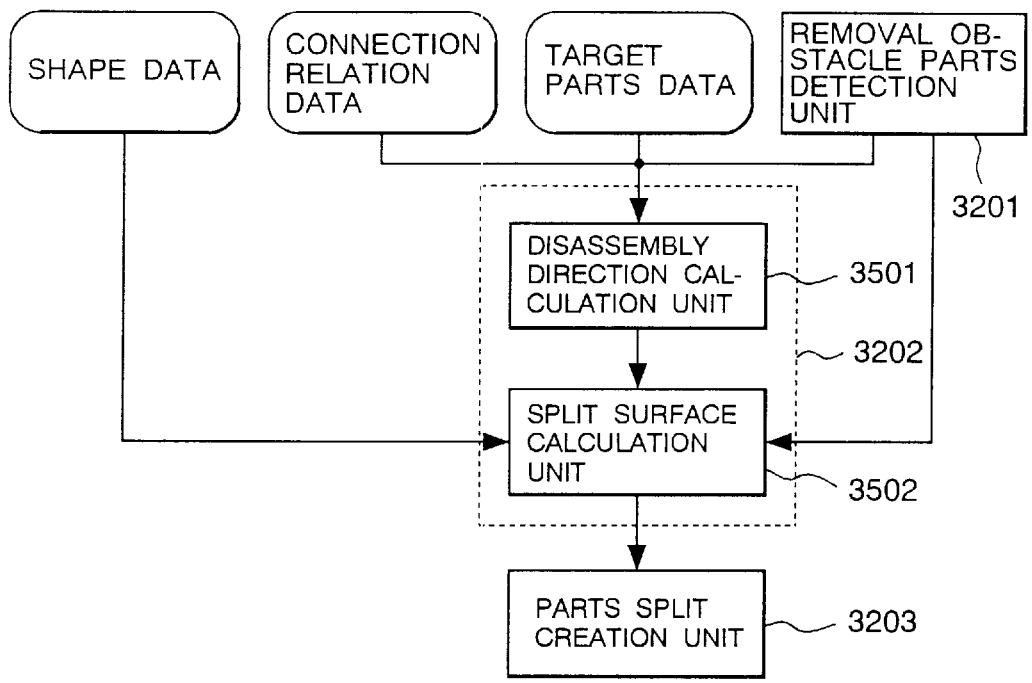
FIG. 35 is a function block diagram showing the concrete function constitution of the split surface creation unit in the parts split data creation unit shown in FIG. 32.

FIG. 35 is a function block diagram showing the concrete function constitution of the split surface creation unit 3202. In the drawing, a disassembly direction calculation unit 3501 is a function block for calculating the direction for disassembling a removal obstacle part from the target parts data inputted by the target parts input unit 106, the connection relation data inputted by the connection relation input unit 101, and the removal obstacle parts data detected by the removal obstacle parts detection unit 3201. The disassembly direction is obtained by obtaining the direction capable of disassembling of the removal obstacle part from the connection relation between the target part and the removal obstacle part. A split surface calculation unit 3502 is a function block for calculating a split surface from the disassembly direction data calculated by the disassembly direction calculation unit 3501, the shape data inputted by the shape input unit 2701, and the removal obstacle parts data detected by the removal obstacle parts detection unit 3201. The split surface is obtained by calculating a plane which is perpendicular to the disassembly direction, in contact with the removal obstacle part, and closest to the disassembly direction side.

Figure 36:
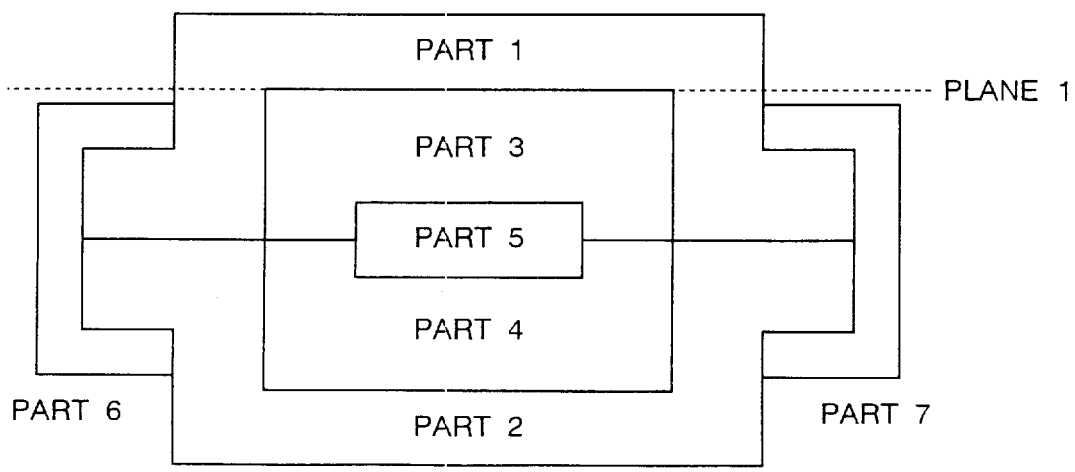
FIG. 36 is a plan view showing an example of split surfaces to be calculated by the split surface calculation unit in the split surface creation unit shown in FIG. 35.

In the case of the machine product shown in FIG. 29, the part 3 which is a removal obstacle part is in contact with the part 5 which is a target part with the planes whose normal vectors are downward, rightward, and leftward respectively, so that the part 3 can be disassembled only upward. Therefore, the disassembly direction of the disassembly direction calculation unit 3501 is upward. In the case of the machine product shown in FIG. 29, the surface on the disassembly direction side which is perpendicular to the disassembly direction and in contact with the part 3 is the plane 1 shown in FIG. 36. Therefore, the split surface calculation unit 3502 regards the plane 1 as a split surface.

Figure 37:
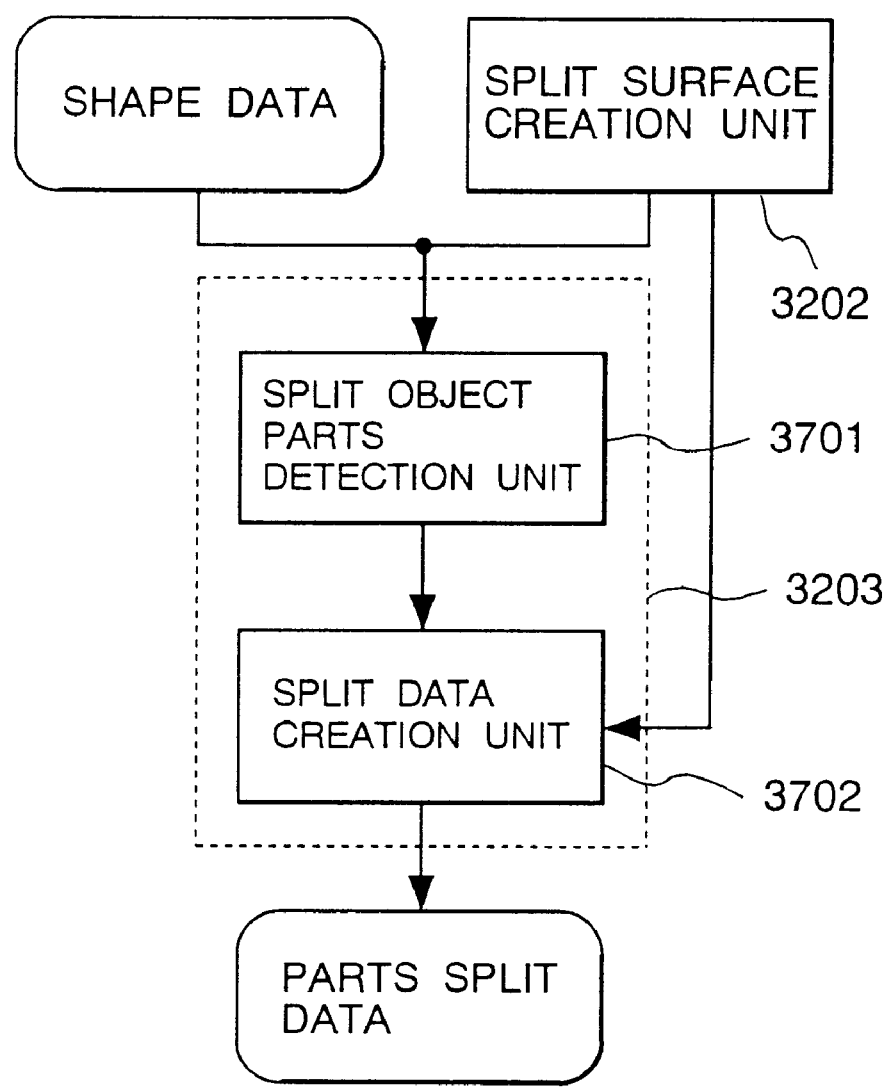
FIG. 37 is a function block diagram showing the concrete function constitution of the parts split creation unit in the parts split data creation unit shown in FIG. 32.

FIG. 37 is a function block diagram showing the concrete function constitution of the parts split creation unit 3203. In the drawing, a split object parts detection unit 3701 is a function block for obtaining a part intersecting the split surface from the split surface data created by the split surface creation unit 3202 and the shape data inputted by the shape input unit 2701. A part intersecting the split surface is detected depending on whether the surface constituting the part intersects the split surface or not. A split data creation unit 3702 is a function block for creating parts split data from the data of the part intersecting the split surface which is detected by the split object parts detection unit 3701 and the split surface data detected by the split surface creation unit 3202. In the case of the machine product shown in FIG. 36, the split part detected by the split object parts detection unit 3701 is the part 1 and the split parts data created by the split data creation unit 3702 comprises a character string of "part 1" which is the part name of the split part and geometric information of the split surface.

Figure 38:
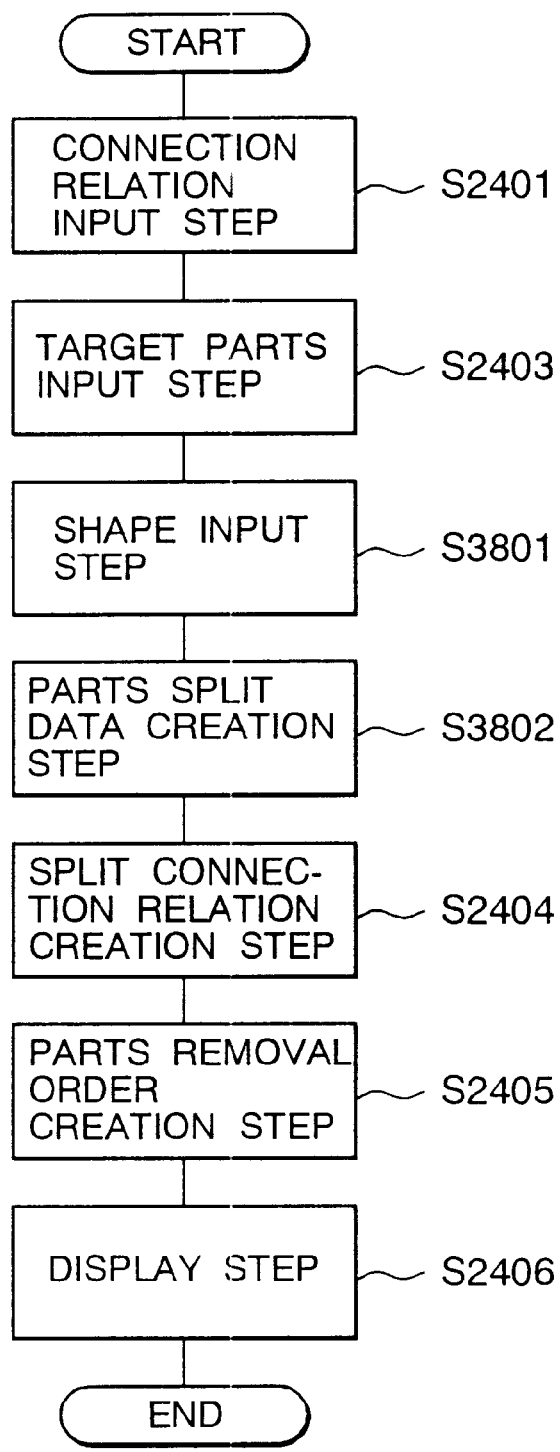
FIG. 38 is a flow chart showing the second embodiment of the parts removal order creation method of the present invention.

FIG. 38 is a flow chart showing the second embodiment of the parts removal order creation method of the present invention. In the drawing, each step of performing the same process as that of the first embodiment shown in FIG. 24 is assigned with the same number and the explanation thereof is omitted.

The shape input step S3801 is a step of inputting shape data indicating the shape of each part of a machine product. The parts split data creation step S3802 is a step of obtaining parts split necessary to remove the target part described in the target parts data from the connection relation data inputted at the connection relation input step S2401, the target parts data inputted at the target parts input step S2403, and the shape data inputted at the shape input step S3801 and outputting it as parts split data.

Figure 39:
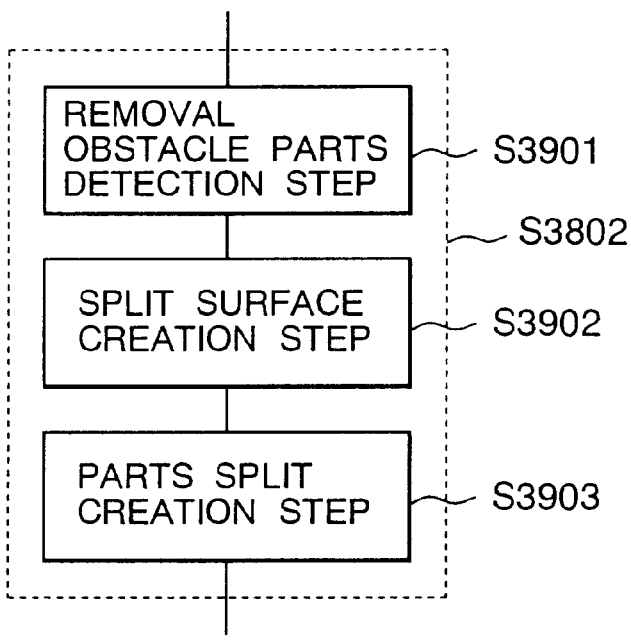
FIG. 39 is a flow chart showing the concrete processing steps of the parts split data creation step in the parts removal order creation method shown in FIG. 38.

FIG. 39 is a flow chart showing the concrete processing steps of the parts split data creation step S3802. The removal obstacle parts detection step S3901 is a step of detecting a removal obstacle part from the connection relation data inputted at the connection relation input step S2401, the target parts data inputted at the target parts input step S2403, and the shape data inputted at the shape input step S3801. The split surface creation step S3902 is a step of creating data relating to the split surface from the removal obstacle parts data detected at the removal parts detection step S3901, the connection relation data inputted at the connection relation input step S2401, the shape data inputted at the shape input step S3801, and the target parts data inputted at the target parts input step S2403. The parts split creation step S3803 creates parts split data from the split surface data created at the split surface creation step S3902 and the shape data inputted at the shape input step S3801.

Figure 40:
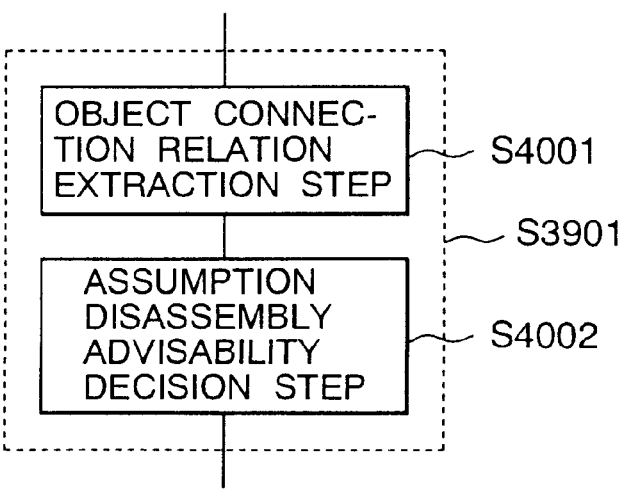
FIG. 40 is a flow chart showing the concrete process of the removal obstacle parts detection step in the parts split data creation step shown in FIG. 39.

FIG. 40 is a flow chart showing the concrete process of the removal obstacle parts detection step. The object connection relation extraction step S4001 is a step of extracting the connection relation of the object part which is a target part or of the destination part thereof from the connection relation data inputted at the connection relation input step S2401 by referring to the target parts data inputted at the target parts input step S2403. The assumption disassembly advisability decision step S4002 is a step of deciding whether the target part becomes capable of disassembling or not when it is assumed that there is no part having a connection relation with the target part from the connection relation extracted at the object connection relation extraction step S4001 and when the target part becomes capable of disassembling, outputting the part which is assumed as not existing as a removal obstacle part.

Figure 41:
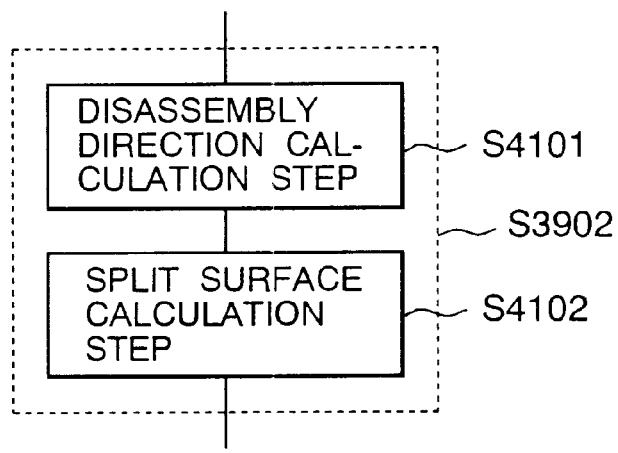
FIG. 41 is a flow chart showing the concrete processes of the split surface creation step in the parts split data creation step shown in FIG. 39.

FIG. 41 is a flow chart showing the concrete processes of the split surface creation step S3902. The disassembly direction calculation step S4101 is a step of calculating the direction for disassembling a removal obstacle part from the target parts data inputted at the target parts input step S2403, the connection relation data inputted at the connection relation input step S2401, and the removal obstacle parts data detected at the removal obstacle parts detection step S3901. The split surface calculation step S4102 is a step of calculating data relating to the split surface from the disassembly direction data calculated at the disassembly direction calculation step S4101, the shape data inputted at the shape input step S3801, and the removal obstacle parts data detected at the removal obstacle parts detection step S3901.

Figure 42:
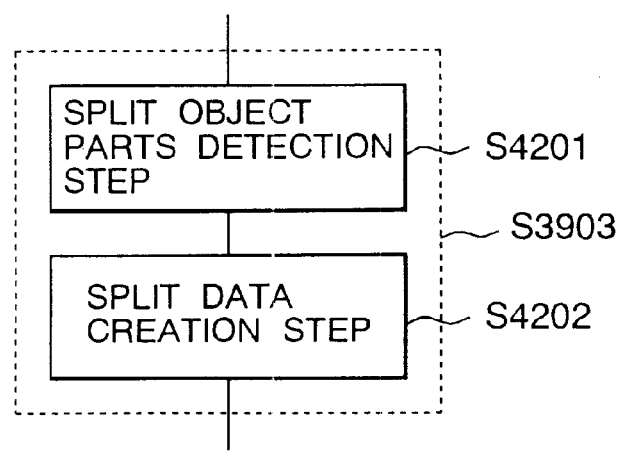
FIG. 42 is a flow chart showing the concrete processes of the parts split creation step in the parts split data creation step shown in FIG. 39.

FIG. 42 is a flow chart showing the concrete processes of the parts split creation step S3903. The split object parts detection step S4201 is a step of obtaining a part intersecting the split surface from the split surface data created at the split surface creation step S3902 and the shape data inputted at the shape input step S3801. The split data creation step S4202 is a step of creating parts split data from the data of the part intersecting the split surface which is detected at the split object parts detection step S4201 and the split surface data detected at the split surface creation step S3902.

The parts removal order creation method of this embodiment detects a removal obstacle part for a target part, splits it so as to be convenient for disassembling the removal obstacle part, disassembles the removal obstacle part, and then removes the target part.

The parts removal order creation method of this embodiment can be recorded on a recording medium such as CD-ROM or a floppy disk as a program. In this case, as a second embodiment of the program to be recorded on a recording medium, the program disclosed in the flow chart shown in FIGS. 38 to 42 can be used.

In the explanation of the present invention, a "machine product" is used as a product which is an object of part disassembly. However, as an object of the present invention, not only disassembling of electric equipment using electricity or partial components of a large scale plant is included but also removing of partial components from a solidified chemical substance is included.

According to the parts removal order creation apparatus and method of the present invention and the recording medium recording the parts removal order program, even a machine product which is assembled by welding or others and has a connection relation which cannot be disassembled by an ordinary method can be disassembled by splitting an independent part into a plurality of parts and a machine product can be discarded efficiently,

We claims:

1. A parts removal order creation apparatus comprising:
   a mating relation input unit for inputting mating relation data indicating the relationship among parts in the assembled state;
   a parts split input unit for inputting parts split data indicating a part to be split and a split surface thereof;
   a target parts input unit for inputting target part data indicating a target part which is a target of removal;
   a split mating relation creation unit for creating split mating relation data indicating the mating relation after parts are split in accordance with said mating relation data inputted by said mating relation input unit and said parts split data inputted by said parts split input unit;
   a removal order creation unit for creating removal order data indicating the order until at least the target part also including parts which are split is removed from said split mating relation data created by said split mating relation creation unit and said target part data created by said target parts input unit; and
   a display unit for displaying said removal order data created by said removal order creation unit.

2. A parts removal order creation apparatus according to claim 1, wherein said split surface of said part to be split represents a surface of said part to be split extending at least partially through a portion of said part to be split.

3. A parts removal order creation apparatus comprising:
   a mating relation input unit for inputting mating relation data indicating the relationship among parts in the assembled state;
   a target parts input unit for inputting target part data indicating a target part which is a target of removal;
   a shape input unit for inputting shape data indicating the shape of each part of a product to be disassembled;
   a parts split data creation unit for obtaining parts to be split which are necessary to remove said part described in said target part data in accordance with said mating relation data inputted by said mating relation input unit, said target part data inputted by said target parts input unit, and said shape data inputted by said shape input unit and outputting parts split data indicative thereof;
   a split mating relation creation unit for creating split mating relation data indicating the mating relation after parts are split in accordance with said mating relation data inputted by said mating relation input unit and said parts split data created by said parts split data creation unit;
   a removal order creation unit for creating removal order data indicating the order until at least the target part including parts which are split is removed from said split mating relation data created by said split connection relation creation unit and said target part data inputted by said target parts input unit; and
   a display unit for displaying said removal order data created by said removal order creation unit.

4. A parts removal order creation apparatus according to claim 3, wherein said parts split data includes data indicating a splitting surface extending through at least a portion of said parts to be split and along which said parts are split.

5. A parts removal order creation method comprising:
   a mating relation input step of inputting mating relation data indicating the relationship among parts in the assembled state;
   a parts split input step of inputting parts split data indicating a part to be split and a split surface thereof;
   a target parts input step of inputting target part data indicating a target part which is a target of removal;
   a split mating relation creation step of creating split mating relation data indicating the mating relation after parts are split in accordance with said mating relation data inputted at said mating relation input step and said parts split data inputted at said parts split input step;
   a removal order creation step of creating removal order data indicating the order until at least the target part also including parts which are split is removed from said split mating relation data created at said split connection relation creation step and said target part data created at said target parts input step; and
   display step of displaying said removal order data created at said removal order creation step.

6. A parts removal order creation method according to claim 5, wherein said parts split data indicating a split surface of a part to be split indicates a surface extending at least partially through a portion of said part to be split and along which said part to be split is split.

7. A parts removal order creation method comprising:
   a mating relation input step of inputting mating relation data indicating the relationship among parts in the assembled state;
   a target parts input step of inputting target part data indicating a target part which is a target of removal;
   a shape input step of inputting shape data indicating the shape of each part of a product to be disassembled;
   a parts split data creation step of obtaining parts to be split which are necessary to remove said part described in said target part data in accordance with said mating relation data inputted at said mating relation input step, said target part data inputted at said target parts input step, and said shape data inputted at said shape input step and outputting parts split data indicative thereof;
   a split mating relation creation step of creating split mating relation data indicating the mating relation after parts are split in accordance with said mating relation data inputted at said mating relation input step and said parts split data created at said parts split data creation step;
   a removal order creation step of creating removal order data indicating the order until at least the target part including parts which are split is removed from said split mating relation data created at said split mating relation creation step and said target part data inputted at said target parts input step; and
   a display step of displaying said removal order data created at said removal order creation step.

8. A parts removal order creation method according to claim 7, wherein said parts split data indicates a splitting surface extending at least partially through a portion of said parts to be split and along which said parts to be split are split.

9. A recording medium recording a parts removal order program which can be read by a computer which records a program for allowing said computer to execute:

a mating relation input step of inputting mating relation data indicating the relationship among parts in the assembled state;
a parts split input step of inputting parts split data indicating the part to be split and the split surface thereof;
a target parts input step of inputting target part data indicating a target part which is a target of removal;
a split mating relation creation step of creating split mating relation data indicating the mating relation after parts are split in accordance with said matins relation data inputted at said mating relation input step and said parts split data inputted at said parts split input step; and
a removal order creation step of creating removal order data indicating the order until at least the target part also including parts which are split is removed from said split mating relation data created at said split mating relation creation step and said target part data created at said target parts input step.

10. A recording medium according to claim 9, wherein said recording medium records said parts removal order program which can be read by said computer which is characterized in that said computer records the program for allowing said computer to execute a display step of displaying said removal order data created at said removal order creation step.

11. A recording medium according to claim 9, wherein the split surface of the parts split data is a surface extending at least partially through a portion of the part to be split and along which the part to be split is split.

12. A recording medium recording a parts removal order program which can be read by a computer which records a program for allowing said computer to execute:
   a mating relation input step of inputting mating relation data indicating the relationship among parts in the assembled state;
   a target parts input step of inputting target part data indicating a target part which is a target of removal;
   a shape input step of inputting shape data indicating the shape of each part of a product to be disassembled;
   a parts split data creation step of obtaining parts to be split which are necessary to remove the part described in the target part data in accordance with said mating relation data inputted at said mating relation input step, said target part data inputted at said target parts input step, and said shape data inputted at said shape input step and outputting parts split data indicative thereof;
   a split mating relation creation step of creating split mating relation data indicating the mating relation after parts are split in accordance with said mating relation data inputted at said mating relation input step and said parts split data created at said parts split data creation step; and
   a removal order creation step of creating removal order data indicating the order until at least the target part including parts which are split is removed from said split connection relation data created at said split mating relation creation step and said target part data inputted at said target parts input step.

13. A recording medium according to claim 12, wherein said recording medium records a program for allowing said computer to execute a display step of displaying said removal order data created at said removal order creation step.

14. A recording medium according to claim 12, wherein said parts split data indicates a splitting surface of said parts to be split which extends at least partially through a portion of said parts to be split and along which said parts to be split are split.

15. A parts removal order creation apparatus comprising:
- a mating relation input unit for inputting mating relation data including welding information and indicating the relationship among parts in the assembled state;
- a parts split input unit for inputting parts split data including cutting information and indicating a part to be split and a split surface thereof in accordance with the cutting information;
- a target parts input unit for inputting target part data indicating a target part which is a target of removal;
- a split mating relation creation unit for creating split mating relation data indicating the mating relation after parts are split in accordance with said mating relation data inputted by said mating relation input unit and said parts split data inputted by said parts split input unit;
- a removal order creation unit for creating removal order data indicating the order until at least the target part also including parts which are split is removed in accordance with said split mating relation data created by said split mating relation creation unit and said target part data created by said target parts input unit; and
- display unit for displaying said removal order data created by said removal order creation unit.

16. A parts removal order creation apparatus according to claim 15, wherein said split surface of said parts split data represents a surface extending at least partially through a part to be split and along which said part to be split is split by cutting therealong.

* * * * *